(12) United States Patent
Yang et al.

(10) Patent No.: US 10,409,841 B2
(45) Date of Patent: Sep. 10, 2019

(54) USER BEHAVIOR RECOGNITION METHOD, USER EQUIPMENT, AND BEHAVIOR RECOGNITION SERVER

(71) Applicant: Huawei Technologies Co., Ltd., Shenzhen (CN)

(72) Inventors: Qiang Yang, Shenzhen (CN); Ke Deng, Shenzhen (CN); Wing Ki Leung, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 256 days.

(21) Appl. No.: 15/358,410

(22) Filed: Nov. 22, 2016

(65) Prior Publication Data
US 2017/0075982 A1 Mar. 16, 2017

Related U.S. Application Data

(63) Continuation of application No. PCT/CN2015/072627, filed on Feb. 10, 2015.

(30) Foreign Application Priority Data

May 22, 2014 (CN) .......................... 2014 1 0217036

(51) Int. Cl.
*G06F 16/28* (2019.01)
*G06F 16/2458* (2019.01)
(Continued)

(52) U.S. Cl.
CPC ............ *G06F 16/285* (2019.01); *G06F 3/011* (2013.01); *G06F 16/2462* (2019.01);
(Continued)

(58) Field of Classification Search
CPC ......... G06F 17/30598; G06F 17/30536; G06F 16/285; G06F 16/2462
(Continued)

(56) References Cited

U.S. PATENT DOCUMENTS 8,021,297 B2 9/2011 Aerts
9,426,139 B1 * 8/2016 McClintock ............ H04L 63/08
(Continued)

FOREIGN PATENT DOCUMENTS

CN 100545658 C 9/2009
CN 103412882 A 11/2013
(Continued)

OTHER PUBLICATIONS

Foreign Communication From a Counterpart Application, Chinese Application No. 201410217036.5, Chinese Search Report dated Aug. 18, 2017, 2 pages.
(Continued)

*Primary Examiner* — Joshua Bullock
(74) *Attorney, Agent, or Firm* — Conley Rose, P.C.

(57) ABSTRACT

A user behavior recognition method, a user equipment, a behavior recognition server, and a behavior recognition system are presented, where the method includes acquiring, by a first user equipment, statistical distribution information of a target parameter corresponding to a target user behavior, where the target parameter includes at least one parameter in a behavior recognition model of the target user behavior, and the statistical distribution information of the target parameter is determined according to values of the target parameters in behavior recognition models of the target user behavior that are respectively corresponding to multiple other user equipment; and creating and saving, according to the statistical distribution information, a behavior recognition model of the target user behavior, to recognize the target user behavior.

14 Claims, 4 Drawing Sheets

(51) Int. Cl.
*G06F 3/01* (2006.01)
*G06K 9/00* (2006.01)
*G06K 9/62* (2006.01)

(52) U.S. Cl.
CPC ..... *G06K 9/00335* (2013.01); *G06K 9/00973* (2013.01); *G06K 9/6278* (2013.01)

(58) Field of Classification Search
USPC .......................................................... 707/740
See application file for complete search history.

(56) References Cited

U.S. PATENT DOCUMENTS

| | | | | |
|---|---|---|---|---|
| 10,057,227 | B1* | 8/2018 | Hess | H04L 63/08 |
| 2007/0239637 | A1* | 10/2007 | Paek | G06F 17/276 |
| | | | | 706/20 |
| 2011/0319094 | A1 | 12/2011 | Usui et al. | |
| 2012/0136890 | A1 | 5/2012 | Wen et al. | |
| 2013/0262352 | A1 | 10/2013 | Sung et al. | |
| 2014/0108317 | A1 | 4/2014 | Zhang et al. | |
| 2017/0091651 | A1* | 3/2017 | Miao | G06N 99/005 |
| 2017/0091652 | A1* | 3/2017 | Miao | G06N 99/005 |
| 2017/0323268 | A1* | 11/2017 | Zhang | G06F 17/3053 |
| 2018/0060150 | A1* | 3/2018 | Cunico | G06F 11/079 |

FOREIGN PATENT DOCUMENTS

| | | |
|---|---|---|
| CN | 103412930 A | 11/2013 |
| CN | 103685208 A | 3/2014 |
| CN | 103778555 A | 5/2014 |
| EP | 3001332 A1 | 3/2016 |

OTHER PUBLICATIONS

Foreign Communication From a Counterpart Application, Chinese Application No. 201410217036.5, Chinese Office Action dated Sep. 4, 2017, 4 pages.

Calatroni, A., et al., "Context Cells: Towards Lifelong Learning in Activity Recognition Systems," Sep. 16-18, 2009, 14 pages.

Fikri, M., et al., "Classification Algorithms in Human Activity Recognition using Smartphones," World Academy of Science, Engineering and Technology, vol. 68, Aug. 27, 2012, pp. 372-379.

Bg19bot, et al., "Recommender system," Wikipedia, XP055282430, Jul. 29, 2014, 9 pages.

Foreign Communication From a Counterpart Application, European Application No. 15796385.1, Extended European Search Report dated Apr. 13, 2017, 10 pages.

Foreign Communication From a Counterpart Application, PCT Application No. PCT/CN2015/072627, English Translation of International Search Report dated Apr. 29, 2015, 2 pages.

Foreign Communication From a Counterpart Application, PCT Application No. PCT/CN2015/072627, English Translation of Written Opinion dated Apr. 29, 2015, 14 pages.

* cited by examiner

USER BEHAVIOR RECOGNITION METHOD, USER EQUIPMENT, AND BEHAVIOR RECOGNITION SERVER

CROSS-REFERENCE TO RELATED APPLICATIONS

This application is a continuation of International Application No. PCT/CN2015/072627, filed on Feb. 10, 2015, which claims priority to Chinese Patent Application No. 201410217036.5, filed on May 22, 2014. The disclosures of the aforementioned applications are hereby incorporated by reference in their entireties.

TECHNICAL FIELD

Embodiments of the present disclosure relate to the field of data mining, and more specifically, to a user behavior recognition method, a user equipment, a behavior recognition server, and a behavior recognition system.

BACKGROUND

As an individualized demand of a user for a smartphone increases, a user behavior recognition function has become a basic configuration of the smartphone. The user behavior recognition function means that a behavior of a user can be determined at a specific time, at a specific place, or on a specific occasion, to enable the smartphone to predict a requirement of the user based on the determined behavior of the user, automatically adjust various settings, and provide a related service for the user. A user behavior may refer to an activity status of the user, such as, walking, running, staying still, climbing stairs, walking down stairs, or sleeping, or refer to a scenario that the user is in, such as, in an office, in a car, on a train, outdoors, indoors, in a conference, or in a theater, or a combination of an activity status of the user and a scenario that the user is in, that is, staying still in a car, staying still in a conference, or the like.

User behavior recognition is based on a behavior recognition model. A smartphone may create one behavior recognition model for each user behavior. When collecting a group of sensing data, the smartphone may input the sensing data to the foregoing created behavior recognition model, and determine, according to an output result of the behavior recognition model, a behavior corresponding to the sensing data. A common method for creating a behavior recognition model is a machine learning method. In this method, generally, a large amount of training data is required to create an accurate behavior recognition model. However, in reality, there is usually little available training data, and accuracy of behavior recognition performed by a behavior recognition model created in this case is relatively poor. After obtaining an initial behavior recognition model, each user needs to accumulate training data of the user, and update a behavior recognition model of the user according to the accumulated training data, to improve accuracy of behavior recognition performed by the behavior recognition model.

Therefore, in the prior art, different users are separated from each other, and each user needs to independently create a new behavior recognition model, independently accumulate training data, and update the new behavior recognition model according to the accumulated training data. This process is usually time-consuming and strenuous. Therefore, scalability of the prior art for a new user behavior is relatively poor, accuracy of a new behavior recognition model created by a user is relatively low, relatively long time of learning is required to meet an accuracy requirement of the user for behavior recognition, and user experience is relatively poor.

SUMMARY

The present disclosure provides a user behavior recognition method, a user equipment, a behavior recognition server, and a behavior recognition system, which can improve efficiency and accuracy of creating a behavior recognition model.

According to a first aspect, a user behavior recognition method is provided, including acquiring, by a first user equipment, statistical distribution information of a target parameter corresponding to a target user behavior, where the target parameter includes at least one parameter in a behavior recognition model of the target user behavior, and the statistical distribution information of the target parameter is determined according to values of the target parameter in behavior recognition models of the target user behavior that are respectively corresponding to multiple other user equipment; and creating and saving, by the first user equipment according to the statistical distribution information of the target parameter, a behavior recognition model of the target user behavior that is corresponding to the first user equipment, to recognize the target user behavior.

With reference to the first aspect, in a first possible implementation manner, the statistical distribution information of the target parameter includes at least one piece of the following information: a probability distribution curve of the target parameter, an expected value of the target parameter, and a value of the target parameter that has a largest occurrence probability.

With reference to the foregoing possible implementation manner, in a second possible implementation manner, if the behavior recognition model is a naive Bayes classifier, a first feature with continuous feature values in the naive Bayes classifier is a first target parameter, a second feature with discrete feature values in the naive Bayes classifier is a second target parameter, and the statistical distribution information of the target parameter includes at least one piece of the following information: an expected value of a normal distribution parameter that the first feature has in each category of the target user behavior, and a statistical distribution curve of the second feature for each category of the target user behavior.

With reference to the foregoing possible implementation manners, in a third possible implementation manner, the acquiring, by a first user equipment, statistical distribution information of a target parameter corresponding to a target user behavior includes sending, by the first user equipment, a data download request to a behavior recognition server, where the data download request includes an identifier of the target user behavior; and receiving, by the first user equipment, the statistical distribution information of the target parameter that is determined by the behavior recognition server according to the identifier of the target user behavior, where the statistical distribution information of the target parameter is determined by the behavior recognition server according to the values of the target parameter in the multiple behavior recognition models of the target user behavior that are sent by the multiple user equipment to the behavior recognition server.

With reference to the foregoing possible implementation manners, in a fourth possible implementation manner, the acquiring, by a first user equipment, statistical distribution information of a target parameter corresponding to a target user behavior includes receiving, by the first user equipment, the multiple behavior recognition models of the target user behavior that are respectively sent by the multiple user equipment; and determining, by the first user equipment, the statistical distribution information of the target parameter according to the values of the target parameter in the received multiple behavior recognition models of the target user behavior.

With reference to the foregoing possible implementation manners, in a fifth possible implementation manner, the method further includes sending, by the first user equipment, the behavior recognition model of the target user behavior that is created by the first user equipment to the behavior recognition server, so that the behavior recognition server updates the statistical distribution information of the target parameter according to a value of the target parameter in the behavior recognition model.

According to a second aspect, another user behavior recognition method is provided, including receiving, by a behavior recognition server, a data download request sent by a first user equipment, where the data download request includes an identifier of a target user behavior; determining, by the behavior recognition server according to the identifier of the target user behavior, statistical distribution information of a target parameter corresponding to the target user behavior, where the target parameter includes at least one parameter in a behavior recognition model of the target user behavior, and the statistical distribution information of the target parameter is determined according to values of the target parameter in behavior recognition models of the target user behavior that are respectively corresponding to multiple other user equipment; and sending, by the behavior recognition server, the statistical distribution information of the target parameter to the first user equipment, so that the first user equipment creates the behavior recognition model of the target user behavior according to the statistical distribution information of the target parameter.

With reference to the second aspect, in a first possible implementation manner, the statistical distribution information of the target parameter includes at least one piece of the following information: a probability distribution curve of the target parameter, an expected value of the target parameter, and a value of the target parameter that has a largest occurrence probability.

With reference to the foregoing possible implementation manner, in a second possible implementation manner, if the behavior recognition model of the target user behavior is a naive Bayes classifier, a first feature with continuous feature values in the naive Bayes classifier is a first target parameter, a second feature with discrete feature values in the naive Bayes classifier is a second target parameter, and the statistical distribution information of the target parameter includes at least one piece of the following information: an expected value of a normal distribution parameter that the first feature has in each category of the target user behavior, and a statistical distribution curve of the second feature for each category of the target user behavior.

With reference to the foregoing possible implementation manners, in a third possible implementation manner, the behavior recognition server has a basic knowledge base and multiple coordinated knowledge bases, where the basic knowledge base is used to store statistical distribution information of a target parameter corresponding to at least one user behavior, where the statistical distribution information is commonly used by multiple user groups, and each coordinated knowledge base in the multiple coordinated knowledge bases is used to store statistical distribution information of a target parameter corresponding to at least one user behavior, where the statistical distribution information is exclusively used by one user group in the multiple user groups, and the at least one user behavior includes the target user behavior; and the determining, by the behavior recognition server according to the identifier of the target user behavior, statistical distribution information of a target parameter corresponding to the target user behavior includes determining, by the behavior recognition server, a user group of the first user equipment; and if the first user equipment does not belong to any user group in the multiple user groups, determining, by the behavior recognition server from the basic knowledge base, the statistical distribution information of the target parameter corresponding to the target user behavior; or if the first user equipment belongs to a first user group in the multiple user groups, determining, by the behavior recognition server from a coordinated knowledge base corresponding to the first user group, the statistical distribution information of the target parameter corresponding to the target user behavior.

With reference to the foregoing possible implementation manners, in a fourth possible implementation manner, the method further includes receiving, by the behavior recognition server, the behavior recognition model of the target user behavior that is created by the first user equipment according to the statistical distribution information of the target parameter and sent by the first user equipment; and updating, by the behavior recognition server, the statistical distribution information of the target parameter according to the behavior recognition model sent by the first user equipment.

With reference to the foregoing possible implementation manners, in a fifth possible implementation manner, the updating, by the behavior recognition server, the statistical distribution information of the target parameter according to the behavior recognition model sent by the first user equipment includes determining, by the behavior recognition server according to the behavior recognition model sent by the first user equipment, a value of the target parameter that is corresponding to the first user equipment; and collecting, by the behavior recognition server, mathematical statistics on a value of the target parameter according to the values of the target parameter that are respectively corresponding to the multiple other user equipment, and the value of the target parameter that is corresponding to the first user equipment, and determining that a statistical result is updated statistical distribution information of the target parameter.

With reference to the foregoing possible implementation manners, in a sixth possible implementation manner, before the receiving a data download request sent by a first user equipment, the method further includes receiving, by the behavior recognition server, the multiple behavior recognition models of the target user behavior that are respectively sent by the multiple other user equipment; determining, by the behavior recognition server according to the multiple behavior recognition models of the target user behavior that are respectively sent by the multiple other user equipment, the values of the target parameter that are respectively corresponding to the multiple other user equipment; and determining, by the behavior recognition server, the statistical distribution information of the target parameter according to the values of the target parameter that are respectively corresponding to the multiple other user equipment.

According to a third aspect, a user equipment is provided, including an acquiring module configured to acquire statistical distribution information of a target parameter corresponding to a target user behavior, where the target parameter includes at least one parameter in a behavior recognition model of the target user behavior, and the statistical distribution information of the target parameter is determined according to values of the target parameter in behavior recognition models of the target user behavior that are respectively corresponding to multiple other user equipment; and a model creating module configured to create and save, according to the statistical distribution information of the target parameter that is acquired by the acquiring module, a behavior recognition model of the target user behavior that is corresponding to the user equipment, to recognize the target user behavior.

With reference to the third aspect, in a first possible implementation manner, the statistical distribution information of the target parameter includes at least one piece of the following information: a probability distribution curve of the target parameter, an expected value of the target parameter, and a value of the target parameter that has a largest occurrence probability.

With reference to the foregoing possible implementation manner, in a second possible implementation manner, if the behavior recognition model is a naive Bayes classifier, a first feature with continuous feature values in the naive Bayes classifier is a first target parameter, a second feature with discrete feature values in the naive Bayes classifier is a second target parameter, and the statistical distribution information of the target parameter includes at least one piece of the following information: an expected value of a normal distribution parameter that the first feature has in each category of the target user behavior, and a statistical distribution curve of the second feature for each category of the target user behavior.

With reference to the foregoing possible implementation manners, in a third possible implementation manner, the acquiring module includes a first sending unit configured to send a data download request to a behavior recognition server, where the data download request includes an identifier of the target user behavior; and a first receiving unit configured to receive the statistical distribution information of the target parameter that is determined by the behavior recognition server according to the identifier of the target user behavior that is sent by the sending unit, where the statistical distribution information of the target parameter is determined by the behavior recognition server according to the values of the target parameter in multiple behavior recognition models of the target user behavior that are sent by the multiple other user equipment to the behavior recognition server.

With reference to the foregoing possible implementation manners, in a fourth possible implementation manner, the acquiring module includes a second receiving unit configured to receive the multiple behavior recognition models of the target user behavior that are respectively sent by the multiple other user equipment; and a determining unit configured to determine the statistical distribution information of the target parameter according to the values of the target parameter in the multiple behavior recognition models of the target user behavior that are received by the second receiving unit.

With reference to the foregoing possible implementation manners, in a fifth possible implementation manner, the user equipment further includes a sending module configured to send the behavior recognition model of the target user behavior that is created by the model creating module to the behavior recognition server, so that the behavior recognition server updates the statistical distribution information of the target parameter according to a value of the target parameter in the behavior recognition model.

According to a fourth aspect, a behavior recognition server is provided, including a receiving module configured to receive a data download request sent by a first user equipment, where the data download request includes an identifier of a target user behavior; a determining module configured to determine, according to the identifier of the target user behavior that is received by the receiving module, statistical distribution information of a target parameter corresponding to the target user behavior, where the target parameter includes at least one parameter in a behavior recognition model of the target user behavior, and the statistical distribution information of the target parameter is determined according to values of the target parameter in behavior recognition models of the target user behavior that are respectively corresponding to multiple other user equipment; and a sending module configured to send, to the first user equipment, the statistical distribution information of the target parameter that is determined by the determining module, so that the first user equipment creates the behavior recognition model of the target user behavior according to the statistical distribution information of the target parameter.

With reference to the fourth aspect, in a first possible implementation manner, the statistical distribution information of the target parameter includes at least one piece of the following information: a probability distribution curve of the target parameter, an expected value of the target parameter, and a value of the target parameter that has a largest occurrence probability.

With reference to the foregoing possible implementation manner, in a second possible implementation manner, if the behavior recognition model of the target user behavior is a naive Bayes classifier, a first feature with continuous feature values in the naive Bayes classifier is a first target parameter, a second feature with discrete feature values in the naive Bayes classifier is a second target parameter, and the statistical distribution information of the target parameter includes at least one piece of the following information: an expected value of a normal distribution parameter that the first feature has in each category of the target user behavior, and a statistical distribution curve of the second feature for each category of the target user behavior.

With reference to the foregoing possible implementation manners, in a third possible implementation manner, the behavior recognition server has a basic knowledge base and multiple coordinated knowledge bases, where the basic knowledge base is used to store statistical distribution information of a target parameter corresponding to at least one user behavior, where the statistical distribution information is commonly used by multiple user groups, and each coordinated knowledge base in the multiple coordinated knowledge bases is used to store statistical distribution information of a target parameter corresponding to at least one user behavior, where the statistical distribution information is exclusively used by one user group in the multiple user groups, and the at least one user behavior includes the target user behavior; and the determining module includes a first determining unit configured to determine a user group of the first user equipment; and a second determining unit configured to, if the first determining unit determines that the first user equipment does not belong to any user group in the multiple user groups, determine, by the behavior recognition server from the basic knowledge base, the statistical distribution information of the target parameter corresponding to the target user behavior; or a third determining unit configured to, if the first determining unit determines that the first user equipment belongs to a first user group in the multiple user groups, determine, by the behavior recognition server from a coordinated knowledge base corresponding to the first user group, the statistical distribution information of the target parameter corresponding to the target user behavior.

With reference to the foregoing possible implementation manners, in a fourth possible implementation manner, the receiving module is further configured to receive the behavior recognition model of the target user behavior that is created by the first user equipment according to the statistical distribution information of the target parameter and sent by the first user equipment; and the behavior recognition server further includes an updating module configured to update the statistical distribution information of the target parameter according to the behavior recognition model that is sent by the first user equipment and received by the receiving module.

With reference to the foregoing possible implementation manners, in a fifth possible implementation manner, the updating module includes a fourth determining unit configured to determine, according to the behavior recognition model sent by the first user equipment, a value of the target parameter that is corresponding to the first user equipment; and a statistics collecting unit configured to collect mathematical statistics on a value of the target parameter according to the values of the target parameter that are respectively corresponding to the multiple other user equipment, and the value of the target parameter that is corresponding to the first user equipment and determined by the fourth determining unit, and determine that a statistical result is updated statistical distribution information of the target parameter.

With reference to the foregoing possible implementation manners, in a sixth possible implementation manner, the receiving module is further configured to receive, before receiving the data download request sent by the first user equipment, the multiple behavior recognition models of the target user behavior that are respectively sent by the multiple other user equipment; and the determining module is further configured to determine, according to the multiple behavior recognition models of the target user behavior that are respectively sent by the multiple other user equipment and received by the receiving module, the values of the target parameter that are respectively corresponding to the multiple other user equipment, and determine the statistical distribution information of the target parameter according to the values of the target parameter that are respectively corresponding to the multiple other user equipment.

According to a fifth aspect, a behavior recognition system is provided, including a behavior recognition server and multiple user equipment, where a first user equipment in the multiple user equipment is configured to send a data download request to the behavior recognition server, and the data download request includes an identifier of a target user behavior; the behavior recognition server is configured to determine, according to the identifier of the target user behavior, statistical distribution information of a target parameter corresponding to the target user behavior, and send the statistical distribution information of the target parameter to the first user equipment, where the target parameter includes at least one parameter in a behavior recognition model of the target user behavior, and the statistical distribution information of the target parameter is determined according to values of the target parameter in behavior recognition models of the target user behavior that are respectively corresponding to multiple other user equipment; and the first user equipment is further configured to receive the statistical distribution information of the target parameter that is sent by the behavior recognition server, and create and save, according to the statistical distribution information of the target parameter, a behavior recognition model of the target user behavior that is corresponding to the first user equipment, to recognize the target user behavior.

In a first possible implementation manner, the statistical distribution information of the target parameter includes at least one piece of the following information: a probability distribution curve of the target parameter, an expected value of the target parameter, and a value of the target parameter that has a largest occurrence probability.

Based on the foregoing technical solution, according to the user behavior recognition method, the user equipment, the behavior recognition server, and the behavior recognition system in embodiments of the present disclosure, the user equipment creates a behavior recognition model of a target user behavior according to statistical distribution information of a target parameter corresponding to the target user behavior, where the statistical distribution information of the target parameter is determined according to values of the target parameter that are respectively corresponding to multiple other user equipment. Compared with the prior art in which a behavior recognition module of the target user behavior is created using a large amount of training data, the user behavior recognition method in the embodiments of the present disclosure can improve efficiency and accuracy of creating a behavior recognition model, thereby enhancing user experience.

BRIEF DESCRIPTION OF DRAWINGS

To describe the technical solutions in the embodiments of the present disclosure more clearly, the following briefly introduces the accompanying drawings required for describing the embodiments of the present disclosure or the prior art. The accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. The described embodiments are some but not all of the embodiments of the present disclosure. All other embodiments obtained by a person of ordinary skill in the art based on the embodiments of the present disclosure without creative efforts shall fall within the protection scope of the present disclosure.

It should be understood that in the embodiments of the present disclosure, a user equipment (UE) may be referred to as a terminal, a mobile station (MS), a mobile terminal, and the like. The user equipment may communicate with one or more core networks using a radio access network (RAN). For example, the user equipment may be a mobile phone (or referred to as a cellular phone), or a computer with a mobile terminal; for example, the user equipment may also be a portable, pocket-sized, handheld, computer built-in, or in-vehicle mobile apparatus, which exchanges voice and/or data with the radio access network. However, the embodiments of the present disclosure are not limited thereto.

Figure 1:
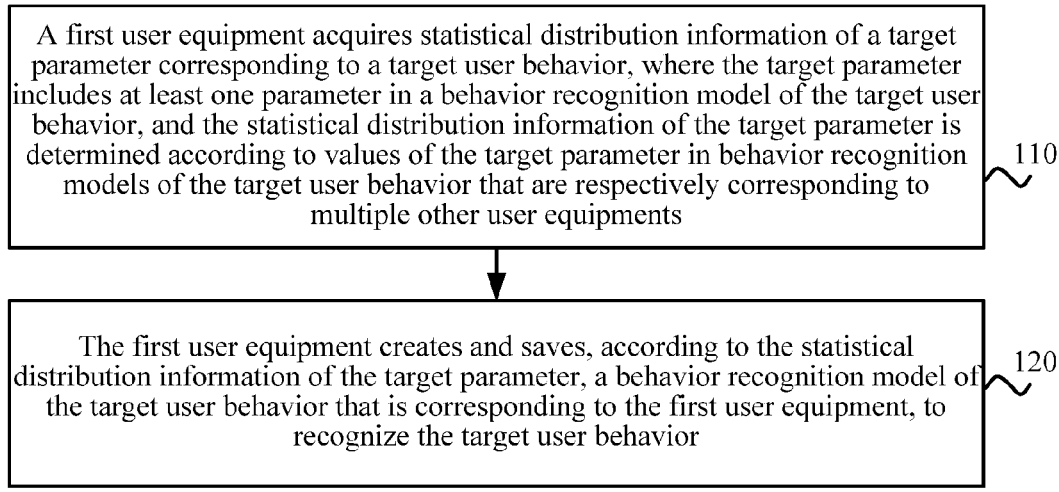
FIG. 1 is a schematic flowchart of a user behavior recognition method according to an embodiment of the present disclosure.

FIG. 1 is a schematic flowchart of a user behavior recognition method 100 according to an embodiment of the present disclosure. The method may be executed by an independent apparatus such as a UE, or may be executed by an integrated module in an apparatus. For ease of description, in the following, an example in which a UE executes the method is used for description. However, this embodiment of the present disclosure is not limited thereto. As shown in FIG. 1, the method 100 includes the following steps.

S110: A first user equipment acquires statistical distribution information of a target parameter corresponding to a target user behavior, where the target parameter includes at least one parameter in a behavior recognition model of the target user behavior, and the statistical distribution information of the target parameter is determined according to values of the target parameter in behavior recognition models of the target user behavior that are respectively corresponding to multiple other user equipment.

The first user equipment may acquire empirical knowledge of the target user behavior, and create and save the behavior recognition model of the target user behavior according to the empirical knowledge of the target user behavior. The empirical knowledge may include the statistical distribution information of the target parameter, and may further include another parameter that can reflect a behavior characteristic of the target user behavior, or include another parameter that can reflect a common characteristic of the behavior recognition models of the target user behavior that are created by the multiple other users. This embodiment of the present disclosure is not limited thereto.

The statistical distribution information of the target parameter may be obtained by collecting mathematical statistics on the values of the target parameter that are respectively corresponding to the multiple other user equipment, where the target parameter may include the at least one parameter in the behavior recognition model of the target user behavior, that is, the target parameter may include some or all parameters in the behavior recognition model of the target user behavior. Optionally, the target parameter may further include a parameter that is related to a parameter in the behavior recognition model of the target user behavior. However, this embodiment of the present disclosure is not limited thereto.

For example, it is assumed that in the behavior recognition model of the target user behavior, distribution of a feature for each category meets a Gaussian distribution function, the target parameter may include an expected value of standard deviations of the Gaussian distribution function of this feature for multiple users, where the standard deviation can reflect importance of a feature of the target user behavior for recognizing the target user behavior. That is, if a feature is an important feature for recognizing the target user behavior, a Gaussian distribution function of this feature has a relatively small standard deviation. However, if a feature is an unimportant feature for recognizing the target user behavior, a Gaussian distribution function of this feature has a relatively large standard deviation. Therefore, when creating the behavior recognition model of the target user behavior, the first UE may use an expected value of standard deviations corresponding to the feature of the target user behavior for the multiple users as a standard deviation that the feature has in the behavior recognition model. However, this embodiment of the present disclosure is not limited thereto.

S120: The first user equipment creates and saves, according to the statistical distribution information of the target parameter, a behavior recognition model of the target user behavior that is corresponding to the first user equipment, to recognize the target user behavior.

The first user equipment may determine, according to the statistical distribution information of the target parameter, a value of the target parameter that is used when the behavior recognition model of the target user behavior is created, and create the behavior recognition model of the target user behavior using the determined value of the target parameter. In this embodiment of the present disclosure, how the first user equipment uses the determined statistical distribution information of the target parameter to create the behavior recognition model of the target user behavior is not limited. A process of creating the behavior recognition model varies with the behavior recognition model. After determining the statistical distribution information of the target parameter according to the method disclosed in this embodiment of the present disclosure, a person skilled in the art may create a corresponding behavior recognition model according to a method in the prior art and a category of the behavior recognition model. Details are not described herein in this embodiment of the present disclosure.

After creating the behavior recognition model of the target user behavior, the first user equipment may save the behavior recognition model of the target user behavior and recognize a user behavior using the behavior recognition model of the target user behavior.

Therefore, according to the user behavior recognition method in this embodiment of the present disclosure, a user equipment creates a behavior recognition model of a target user behavior according to statistical distribution information of a target parameter corresponding to the target user behavior, where the statistical distribution information of the target parameter is determined according to values of the target parameter that are respectively corresponding to multiple other user equipment. Compared with the prior art in which a behavior recognition module of the target user behavior is created using a large amount of training data, the user behavior recognition method in this embodiment of the present disclosure can improve efficiency and accuracy of creating a behavior recognition model, thereby enhancing user experience.

In this embodiment of the present disclosure, the empirical knowledge of the target user behavior can reflect a common characteristic of the behavior recognition models of the target user behavior that are corresponding to the multiple other user equipment, where a behavior recognition model of the target user behavior that is corresponding to one other user equipment may be a behavior recognition model created by the one other user equipment according to a large amount of training data of the target user behavior, or may be a behavior recognition model updated according to sensing data that is collected in actual application by the one other user equipment and related to the target user behavior. This embodiment of the present disclosure is not limited thereto.

Optionally, the statistical distribution information of the target parameter includes at least one piece of the following information: a probability distribution curve of the target parameter, an expected value of the target parameter, and a value of the target parameter that has a largest occurrence probability.

The statistical distribution information of the target parameter may also include other information, for example, an expected value of all values whose occurrence probabilities in the probability distribution curve of the target parameter exceed a threshold, or an expected value of other values in the probability distribution curve of the target parameter except a value whose occurrence probability is lower than a threshold, or the like. This embodiment of the present disclosure is not limited thereto.

In this embodiment of the present disclosure, the behavior recognition model may be any binary classifier in machine learning, such as, a naive Bayes classifier, an artificial neural network classifier, a support vector machine classifier, or a logistic regression model. The binary classifier may be updated in batch, or may be updated in an incremental manner, that is, a classifier may process only new data during an updating process. In consideration of limitations of a UE (such as a smartphone) on a calculating capability, a storage capacity, and a battery capacity, preferably, a classifier, such as a naive Bayes classifier, that is updated in an incremental manner may be used in this embodiment of the present disclosure.

Optionally, if the behavior recognition model is a naive Bayes classifier, a first feature with continuous feature values in the naive Bayes classifier is a first target parameter, a second feature with discrete feature values in the naive Bayes classifier is a second target parameter, and the statistical distribution information of the target parameter includes at least one piece of the following information: an expected value of a normal distribution parameter that the first feature has in each category of the target user behavior, and a statistical distribution curve of the second feature for each category of the target user behavior.

The first user equipment may determine, according to the statistical distribution curve of the second feature for each category of the target user behavior, a distribution curve shape that the second feature presents in each category of the target user behavior, and determine, according to data of the first user equipment and the distribution curve shape, the statistical distribution curve that the second feature corresponding to the first user equipment has in each category of the target user behavior. However, this embodiment of the present disclosure is not limited thereto.

It is assumed that the target user behavior has only two categories, that is, being the target user behavior and not being the target user behavior. For example, the target user behavior is walking, and two categories of walking are respectively walking and not walking. Further, the feature of the target user behavior may include three-dimensional components of an acceleration, time, or place, where the time and the three-dimensional components of an acceleration may have discrete feature values, while the place may have continuous feature values. However, this embodiment of the present disclosure is not limited thereto.

Optionally, the expected value of the normal distribution parameter may include at least one of the following parameters: an expected value of standard deviations of the first feature for each category of the target user behavior on the multiple other UEs, and an expected value of a difference between a value of the first feature for a first category of the target user behavior and a value of the first feature for a second category of the target user behavior on the multiple other UEs. In the naive Bayes classifier, it is generally assumed that distribution functions of a feature with continuous feature values for all categories are all normal distribution (or called Gaussian distribution). If a feature $a_j$ has continuous feature values, $P(a_j|y_i)=g(a_j,\mu_{y_i},\sigma_{y_i})$, where $P(a_j|y_i)$ indicates a conditional probability of the feature $a_j$ for a category $y_i$, $g(a_j,\mu_{y_i},\sigma_{y_i})$ indicates a distribution function of the feature $a_j$ for the category $y_i$, and $g(x,\mu,\sigma)$ has the following form:

$$g(x, \mu, \sigma) = \frac{1}{\sqrt{2\pi}\sigma} e^{-\frac{(x-\mu)^2}{2\sigma^2}} \qquad (1)$$

where $\mu$ is an expected value of x, and $\sigma$ is a standard deviation of x. It may be determined that for each UE in the multiple other UEs, a distribution curve of the first feature for each category of the target user behavior is a value of $\sigma$ of the first feature for each category, where the value is corresponding to each of the other UEs, and the values of $\sigma$ in all categories are averaged on the multiple other UEs, to obtain an expected value of standard deviations of the first feature for all categories. Generally, if the feature $a_j$ is an important feature for recognizing the target user behavior, standard deviations of the feature $a_j$ for all categories of the target user behavior are all relatively small. However, if the feature $a_j$ is an unimportant feature for recognizing the target user behavior, a standard deviation of the feature $a_j$ for at least one category of the target user behavior is relatively large. Accordingly, the first UE may determine, according to the expected value of the standard deviation of the first feature, which feature of the target user behavior is an important feature for recognizing the target user behavior, and create the behavior recognition model of the target user behavior according to the feature of the target user behavior. However, this embodiment of the present disclosure is not limited thereto.

Similarly, a value of $\mu$ of the first feature for each category may be determined and a difference of the values of $\mu$ for all categories is obtained, where the value of $\mu$ is corresponding to each of the other UEs. For example, the target user behavior includes two categories: a first category and a second category. The behavior recognition server may subtract a value of $\mu$ of the first feature for the second category from a value of $\mu$ of the first feature for the first category, to obtain a difference of the values of $\mu$ of the first feature for the two categories, and then, the behavior recognition server averages differences of the values of $\mu$ on the multiple other UEs, and finally, a difference of expected values of the first feature for the first category and the second category is obtained and used as the statistical distribution information of the target parameter corresponding to the target user behavior. However, this embodiment of the present disclosure is not limited thereto.

Optionally, as another embodiment, in the naive Bayes classifier, if the second feature has discrete feature values, a distribution situation of discrete values of the second feature for each category of the target user behavior may be determined according to a behavior recognition model of the target user behavior that is corresponding to each UE in the multiple other UEs, where the discrete values are corresponding to each of the other UEs. Statistics on probabilities of the discrete values of the second feature for each category may be collected, to obtain a distribution curve of the discrete values of the second feature for each category, and then, mathematical statistics may be collected on a distribution curve of the second feature for each category on the multiple other UEs, to obtain a statistical distribution curve of the second feature for each category. Accordingly, the first UE may use a shape of the statistical distribution curve of the second feature as a shape of a distribution curve of the second feature in a behavior recognition model of the first UE, and determine the distribution curve of the second feature according to collected sensing data. However, this embodiment of the present disclosure is not limited thereto.

Optionally, as another embodiment, if the behavior recognition model of the target user behavior is a logistic regression model, and it is assumed that two categories $C_1$ and $C_2$ of the target user behavior respectively represent being the target user behavior and not being the target user behavior, probabilities that one feature occurs in the two categories may be determined using the following formulas:

$$p(C_1|\Phi)=W_0+\sigma(W^T\Phi) \quad (2)$$

$$p(C_2|\Phi)=1-p(C_1|\Phi) \quad (3)$$

where $\Phi=(\Phi_1, \ldots, \Phi_M)^T$ is a feature vector, $W=(W_1, \ldots, W_{M-1})^T$ is a weight vector, a component $W_i$ represents a weight of $\Phi_i$, and $W_0$ represents a deviation. The statistical distribution information of the target parameter may include statistical distribution information of a weight of a feature for each category, for example, an expected value of a weight of the feature for one category. However, this embodiment of the present disclosure is not limited thereto.

Optionally, as another embodiment, the multiple other UEs may send behavior recognition models of the target user behavior that are respectively determined by the multiple other UEs to the behavior recognition server, and the behavior recognition server determines the statistical distribution information of the target parameter according to the behavior recognition models sent by the multiple other UEs. In this case, the first UE may acquire the statistical distribution information of the target parameter from the behavior recognition server. Accordingly, in S110, that the first user equipment acquires the statistical distribution information of the target parameter corresponding to the target user behavior includes sending, by the first user equipment, a data download request to the behavior recognition server, where the data download request includes an identifier of the target user behavior; and receiving, by the first user equipment, the statistical distribution information of the target parameter that is determined by the behavior recognition server according to the identifier of the target user behavior, where the statistical distribution information of the target parameter is determined by the behavior recognition server according to the values of the target parameter in the multiple behavior recognition models of the target user behavior that are sent by the multiple other user equipment to the behavior recognition server.

When needing to create the behavior recognition model of the target user behavior, the first UE may request, by sending the data download request that carries the identifier of the target user behavior to the behavior recognition server, the statistical distribution information of the target parameter corresponding to the target user behavior from the behavior recognition server, where the data download request may carry the identifier of the target user behavior, such as a name or a serial number of the target user behavior. This embodiment of the present disclosure is not limited thereto. The behavior recognition server may determine, according to the identifier of the target user behavior, the statistical distribution information of the target parameter corresponding to the target user behavior, and return the determined statistical distribution information of the target parameter to the first UE.

Optionally, the behavior recognition server may include one empirical knowledge base, where the empirical knowledge base is used to store statistical distribution information of a target parameter corresponding to at least one user behavior including the target user behavior. Optionally, as another embodiment, the behavior recognition server may also group UEs, and determine, for each user group, the statistical distribution information of the target parameter corresponding to the target user behavior. The multiple user groups may be preset, or UEs may be grouped according to one or more factors such as an occupation, an age, a gender, and a residence that are of a user of a UE. For example, the behavior recognition server groups the UEs into four categories according to the gender and the age of the user of the UE, that is, a UE whose user is an adult male, a UE whose user is an adult female, a UE whose user is an underage male, and a UE whose user is an underage female. When executing a same behavior, users of UEs in each user group have a similar behavior characteristic; while when executing a same behavior, users of UEs in each user group have a different behavior characteristic from users of UEs in another user group. Optionally, in the foregoing example, another grouping manner may be further used. This embodiment of the present disclosure is not limited thereto.

The behavior recognition server may include one basic knowledge base and multiple coordinated knowledge bases, where the basic knowledge base is used to store statistical distribution information of a target parameter corresponding to at least one user behavior, where the statistical distribution information is commonly used by multiple user groups, and each coordinated knowledge base in the multiple coordinated knowledge bases is used to store statistical distribution information of a target parameter corresponding to at least one user behavior, where the statistical distribution information is exclusively used by one user group in the multiple user groups, and the at least one user behavior includes the target user behavior. It is assumed that the multiple other UEs may be grouped into two user groups: a first user group and a second user group. Accordingly, the behavior recognition server may have one basic knowledge base and two coordinated knowledge bases. The behavior recognition server may determine, according to values of the target parameter that are respectively corresponding to multiple other UEs belonging to the first user group, statistical distribution information of the target parameter corresponding to the target user behavior, where the statistical distribution information is stored in a first coordinated knowledge base corresponding to the first user group, determine, according to values of the target parameter that are respectively corresponding to multiple other UEs belonging to the second user group, statistical distribution information of the target parameter corresponding to the target user behavior, where the statistical distribution information is stored in a first coordinated knowledge base corresponding to the second user group, and determine, according to values of the target parameter that are respectively corresponding to other UEs belonging to the first user group and the second user group except the first UE, statistical distribution information of the target parameter corresponding to the target user behavior, where the statistical distribution information is stored in the basic knowledge base. However, this embodiment of the present disclosure is not limited thereto.

If the behavior recognition server includes a basic knowledge base and multiple coordinated knowledge bases, when receiving the data download request sent by the first UE, the behavior recognition server may determine a user group to which the first UE belongs. If the behavior recognition server determines that the first UE belongs to a first user group in user groups that are respectively corresponding to the multiple coordinated knowledge bases, the behavior recognition server may determine, from a coordinated knowledge base corresponding to the first user group, the statistical distribution information of the target parameter corresponding to the target user behavior. However, if the behavior recognition server determines that the first UE does not belong to any user group in the user groups corresponding to the coordinated knowledge bases, the behavior recognition server may determine, from the basic knowledge base, the statistical distribution information of the target parameter corresponding to the target user behavior. This embodiment of the present disclosure is not limited thereto. In this way, the first UE creates the behavior recognition model of the target user behavior according to the statistical distribution information of the target parameter that is determined according to a value of the target parameter that is corresponding to another UE belonging to a same group as the first UE, which can further improve accuracy of the behavior recognition model created by the first UE.

Optionally, the behavior recognition server may determine the user group of the first UE in multiple manners. For example, the behavior recognition server may determine the user group of the first UE according to user data uploaded by the first UE. In this case, if the first UE has sent user data to the behavior recognition server, the behavior recognition server may determine the user group of the first UE according to the user data sent by the first UE; otherwise, if the first UE has not sent user data to the behavior recognition server, the behavior recognition server cannot determine the user group of the first UE, that is, the first UE does not belong to any user group in the current multiple user groups. However, this embodiment of the present disclosure is not limited thereto.

Optionally, as another embodiment, in S110, that the first user equipment acquires the statistical distribution information of the target parameter corresponding to the target user behavior includes receiving, by the first user equipment, the behavior recognition models of the target user behavior that are respectively sent by the multiple other user equipment; and determining, by the first user equipment, the statistical distribution information of the target parameter according to the values of the target parameter in the received multiple behavior recognition models of the target user behavior.

The multiple other UEs may actively send, to the first UE, the behavior recognition models of the target user behavior that are respectively created by the multiple other UEs; or the multiple other UEs send the behavior recognition models to the first UE according to a request of the first UE. This embodiment of the present disclosure is not limited thereto. After receiving the behavior recognition models of the target user behavior that are respectively sent by the multiple other UEs, the first UE may determine a value of the target parameter that is corresponding to each UE in the multiple other UEs, and collect statistics on the values of the target parameter that are respectively corresponding to the multiple UEs, to determine the statistical distribution information of the target parameter.

In this embodiment of the present disclosure, the first UE may determine, in multiple manners, that a new behavior recognition model needs to be created. Optionally, various sensors such as a gyroscope, a locator, an acceleration sensor, and a light sensor may be configured on the first UE. At a moment, a sensor configured on the first UE may collect a group of sensing data, and the first UE may determine, according to the collected sensing data and at least one existing behavior recognition model, at least one user behavior corresponding to the sensing data. For example, the first UE inputs the collected sensing data to at least one behavior recognition model in a current behavior recognition model base, to determine whether the collected sensing data is corresponding to a user behavior specific to each behavior recognition model in the at least one behavior recognition model, and then, the first UE may summarize and display a result of the at least one behavior recognition model, and inquire whether a user approves the currently displayed result. If the user approves or tacitly approves the displayed result, a behavior recognition procedure of the first UE ends; if the user does not approve the displayed result and enters a user instruction, where the user instruction indicates an actual behavior of the user, the UE determines whether a behavior recognition model of the actual behavior exists in the current behavior recognition model base, and if the behavior recognition model of the actual behavior does not exist in the current behavior recognition model base, the UE determines that a new behavior recognition model needs to be created. In this case, the target user behavior is the actual behavior of the user. However, this embodiment of the present disclosure is not limited thereto.

Optionally, as another embodiment, before S110, the method 100 further includes collecting data using a sensor of the first user equipment; determining at least one user behavior according to at least one existing behavior recognition model and the data collected by the sensor; receiving a user instruction, where the user instruction indicates the target user behavior; if the target user behavior is different from the at least one determined user behavior, determining whether the behavior recognition model of the target user behavior exists; and if the behavior recognition model of the target user behavior does not exist, executing S110.

Optionally, as another embodiment, if the behavior recognition model of the target user behavior exists in the first UE, the first UE may further update the behavior recognition model of the target user behavior according to the collected sensing data.

Optionally, as another embodiment, after the first UE creates the behavior recognition model of the target user behavior according to the statistical distribution information of the target parameter corresponding to the target user behavior, the first UE may further send the created behavior recognition model to the behavior recognition server, so that the behavior recognition server updates the statistical distribution information of the target parameter according to the behavior recognition model sent by the first UE; or the first UE may also send the created behavior recognition model to the multiple other UEs, so that the multiple other UEs updates, according to the behavior recognition model sent by the first UE, the behavior recognition models of the target user behavior that are respectively corresponding to the multiple other UEs. However, this embodiment of the present disclosure is not limited thereto.

Optionally, every time after newly creating or updating one behavior recognition model, the first UE may send the behavior recognition model to the behavior recognition server. Alternatively, the first UE may periodically send, to the behavior recognition server, a behavior recognition model that has been newly created or updated in this period. In this case, before the first UE sends the created behavior recognition model to the behavior recognition server, the first UE may further determine whether a time interval for sending a behavior recognition model exceeds a preset sending period, and if the first UE determines that the time interval for sending a behavior recognition model exceeds the preset sending period, the first UE sends the created behavior recognition model of the target user behavior to the behavior recognition server.

The preset sending period may be in a unit of day or month, and the preset sending period may be set by a user. However, this embodiment of the present disclosure is not limited thereto.

Optionally, as another embodiment, the first UE may further send user data to the behavior recognition server, so that the behavior recognition server determines the user group of the first UE according to the sent user data. Optionally, the user data may include any data that can enable the behavior recognition server to determine the user group of the first UE. For example, the user data may include the sensing data collected by the first UE and the target user behavior corresponding to the sensing data, or may include an age, a gender, a profession, a residence, and the like of a user of the first UE. This embodiment of the present disclosure is not limited thereto.

Therefore, according to the user behavior recognition method in this embodiment of the present disclosure, a user equipment creates a behavior recognition model of a target user behavior according to statistical distribution information of a target parameter corresponding to the target user behavior, where the statistical distribution information of the target parameter is determined according to values of the target parameter that are respectively corresponding to multiple other user equipment. Compared with the prior art in which a behavior recognition module of the target user behavior is created using a large amount of training data, the user behavior recognition method in this embodiment of the present disclosure can improve efficiency and accuracy of creating a behavior recognition model, thereby enhancing user experience.

Figure 2:
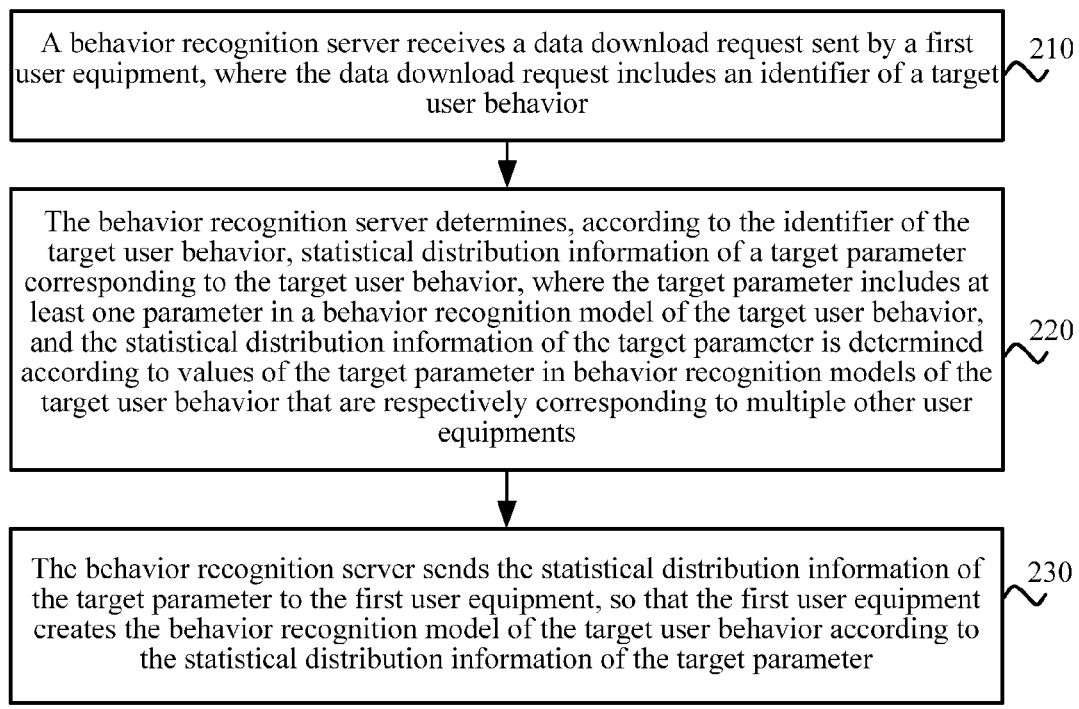
FIG. 2 is a schematic flowchart of a user behavior recognition method according to another embodiment of the present disclosure.

With reference to FIG. 1, the foregoing describes in detail the user behavior recognition method provided in the present disclosure from a perspective of a UE. With reference to FIG. 2, the following describes in detail the user behavior recognition method provided in the present disclosure from a perspective of a behavior recognition server.

FIG. 2 shows a schematic flowchart of a user behavior recognition method 200 according to another embodiment of the present disclosure. The method may be executed by a behavior recognition server. As shown in FIG. 2, the method 200 includes the following steps.

S210: A behavior recognition server receives a data download request sent by a first user equipment, where the data download request includes an identifier of a target user behavior.

S220: The behavior recognition server determines, according to the identifier of the target user behavior, statistical distribution information of a target parameter corresponding to the target user behavior, where the target parameter includes at least one parameter in a behavior recognition model of the target user behavior, and the statistical distribution information of the target parameter is determined according to values of the target parameter in behavior recognition models of the target user behavior that are respectively corresponding to multiple other user equipment.

S230: The behavior recognition server sends the statistical distribution information of the target parameter to the first user equipment, so that the first user equipment creates the behavior recognition model of the target user behavior according to the statistical distribution information of the target parameter.

Therefore, according to the user behavior recognition method in this embodiment of the present disclosure, a user equipment creates a behavior recognition model of a target user behavior according to statistical distribution information of a target parameter corresponding to the target user behavior, where the statistical distribution information of the target parameter is determined according to values of the target parameter that are respectively corresponding to multiple other user equipment. Compared with the prior art in which a behavior recognition module of the target user behavior is created using a large amount of training data, the user behavior recognition method in this embodiment of the present disclosure can improve efficiency and accuracy of creating a behavior recognition model, thereby enhancing user experience.

Optionally, the statistical distribution information of the target parameter includes at least one piece of the following information: a probability distribution curve of the target parameter, an expected value of the target parameter, and a value of the target parameter that has a largest occurrence probability.

Optionally, as another embodiment, if the behavior recognition model is a naive Bayes classifier, a first feature with continuous feature values in the naive Bayes classifier is a first target parameter, a second feature with discrete feature values in the naive Bayes classifier is a second target parameter, and the statistical distribution information of the target parameter includes at least one piece of the following information: an expected value of a normal distribution parameter that the first feature has in each category of the target user behavior, and a statistical distribution curve of the second feature for each category of the target user behavior.

Optionally, the expected value of the normal distribution parameter may include at least one of the following values: an expected value of standard deviations of the first feature for each category of the target user behavior on the multiple other UEs, and an expected value of a difference between a value of the first feature for a first category of the target user behavior and a value of the first feature for a second category of the target user behavior on the multiple other UEs. However, this embodiment of the present disclosure is not limited thereto.

Optionally, the behavior recognition server may have one empirical knowledge base, where the empirical knowledge base is used to store statistical distribution information of a target parameter corresponding to at least one user behavior including the target user behavior. Accordingly, the behavior recognition server may determine, from the empirical knowledge base, the statistical distribution information of the target parameter corresponding to the target user behavior. Optionally, as another embodiment, the behavior recognition server may group UEs, and determine the statistical distribution information of the target parameter for each user group. Accordingly, the behavior recognition server has a basic knowledge base and multiple coordinated knowledge bases, where the basic knowledge base is used to store statistical distribution information of a target parameter corresponding to at least one user behavior, where the statistical distribution information is commonly used by multiple user groups, and each coordinated knowledge base in the multiple coordinated knowledge bases is used to store statistical distribution information of a target parameter corresponding to at least one user behavior, where the statistical distribution information is exclusively used by one user group in the multiple user groups, and the at least one user behavior includes the target user behavior.

Accordingly, in S220, that the behavior recognition server determines, according to the identifier of the target user behavior, statistical distribution information of a target parameter corresponding to the target user behavior includes determining, by the behavior recognition server, a user group of the first user equipment; and if the first user equipment does not belong to any user group in the multiple user groups, determining, by the behavior recognition server from the basic knowledge base, the statistical distribution information of the target parameter corresponding to the target user behavior; or if the first user equipment belongs to a first user group in the multiple user groups, determining, by the behavior recognition server from a coordinated knowledge base corresponding to the first user group, the statistical distribution information of the target parameter corresponding to the target user behavior.

The multiple user groups may be preset, or UEs may be grouped according to one or more factors such as a profession, an age, a gender, or a residence of a user of a UE. The behavior recognition server may also determine the user group of the first UE in multiple manners. Optionally, the behavior recognition server may determine the user group of the first UE according to user data uploaded by the first UE. In this case, if the first UE has sent user data to the behavior recognition server, the behavior recognition server may determine the user group of the first UE according to the user data sent by the first UE; otherwise, if the first UE has not sent user data to the behavior recognition server, the behavior recognition server cannot determine the user group of the first UE, that is, the first UE does not belong to any user group in the current multiple user groups. However, this embodiment of the present disclosure is not limited thereto.

Optionally, as another embodiment, the method 200 further includes receiving, by the behavior recognition server, the behavior recognition model of the target user behavior that is created by the first user equipment according to the statistical distribution information of the target parameter and sent by the first user equipment; and updating, by the behavior recognition server, the statistical distribution information of the target parameter according to the behavior recognition model sent by the first user equipment.

Optionally, the updating, by the behavior recognition server, the statistical distribution information of the target parameter according to the behavior recognition model sent by the first user equipment includes determining, by the behavior recognition server according to the behavior recognition model sent by the first user equipment, a value of the target parameter that is corresponding to the first user equipment; and collecting, by the behavior recognition server, mathematical statistics on a value of the target parameter according to the values of the target parameter that are respectively corresponding to the multiple other user equipment, and the value of the target parameter that is corresponding to the first user equipment, and determining that a statistical result is updated statistical distribution information of the target parameter.

Optionally, as another embodiment, if the behavior recognition server has a basic knowledge base and multiple coordinated knowledge bases, the behavior recognition server may update, according to the behavior recognition model sent by the first UE, the basic knowledge base and/or a coordinated knowledge base corresponding to the user group to which the first UE belongs. However, this embodiment of the present disclosure is not limited thereto.

Optionally, as another embodiment, the method 200 further includes receiving user data sent by the first UE; and determining the user group of the first UE according to the user data sent by the first UE.

Optionally, as another embodiment, before S210, the method 200 further includes receiving, by the behavior recognition server, the behavior recognition models of the target user behavior that are respectively sent by the multiple other user equipment; determining, by the behavior recognition server according to the behavior recognition models of the target user behavior that are respectively sent by the multiple other user equipment, the values of the target parameter that are respectively corresponding to the multiple other user equipment; and determining, by the behavior recognition server, the statistical distribution information of the target parameter according to the values of the target parameter that are respectively corresponding to the multiple other user equipment.

The behavior recognition server may acquire a behavior recognition model of the target user behavior that is sent by each UE in the multiple other UEs and corresponding to each of the other UEs, determine, according to the behavior recognition model of the target user behavior that is sent by each of the other UEs, a value of a target parameter that is corresponding to each of the other UEs, and determine the statistical distribution information of the target parameter by collecting statistics on the values of the target parameter that are respectively corresponding to the multiple other UEs. However, this embodiment of the present disclosure is not limited thereto.

Optionally, as another embodiment, if the behavior recognition server includes multiple coordinated knowledge bases, when determining the statistical distribution information of the target parameter corresponding to the target user behavior, the behavior recognition server may determine, for each user group, the statistical distribution information of the target parameter corresponding to the target user behavior, and save, in one coordinated knowledge base in the multiple coordinated knowledge bases, the statistical distribution information of the target parameter that is corresponding to each user group. Accordingly, the determining, by the behavior recognition server, the statistical distribution information of the target parameter according to the values of the target parameter that are respectively corresponding to the multiple other user equipment includes determining, by the behavior recognition server, at least one other UE in the multiple other UEs that belongs to a first user group; and determining, according to a value of the target parameter that is corresponding to the at least one other UE, statistical distribution information of the target parameter that is stored in a first coordinated knowledge base, where the first coordinated knowledge base is used to store statistical distribution information of the target parameter that is corresponding to the first user group.

Therefore, according to the user behavior recognition method in this embodiment of the present disclosure, a user equipment creates a behavior recognition model of a target user behavior according to statistical distribution information of a target parameter corresponding to the target user behavior, where the statistical distribution information of the target parameter is determined according to values of the target parameter that are respectively corresponding to multiple other user equipment. Compared with the prior art in which a behavior recognition module of the target user behavior is created using a large amount of training data, the user behavior recognition method in this embodiment of the present disclosure can improve efficiency and accuracy of creating a behavior recognition model, thereby enhancing user experience.

Figure 3:
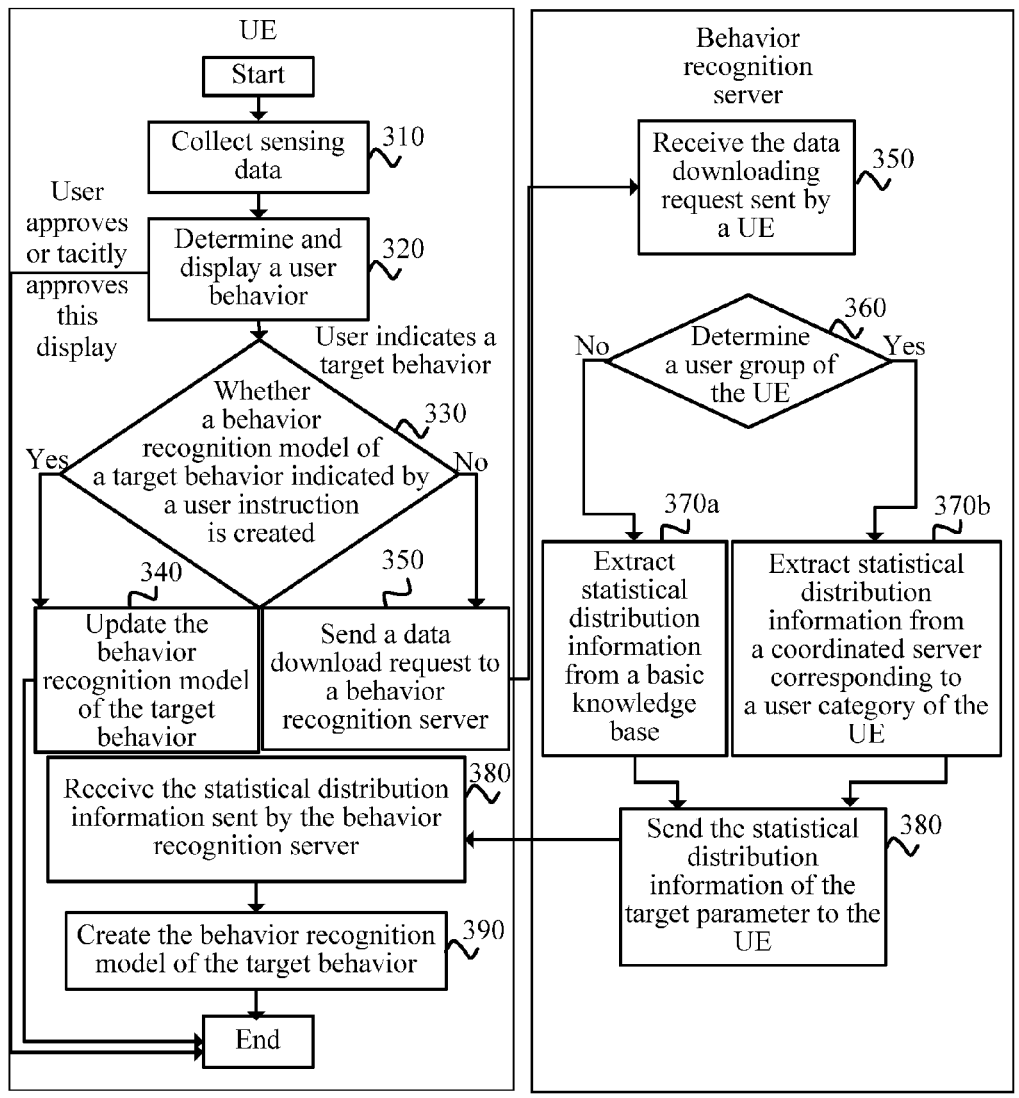
FIG. 3 is a schematic flowchart of a user behavior recognition method according to still another embodiment of the present disclosure.

With reference to a specific example, the following provides a more detailed description of the user behavior recognition method provided in this embodiment of the present disclosure. FIG. 3 shows a schematic flowchart of a user behavior recognition method 300 according to another embodiment of the present disclosure. As shown in FIG. 3, the method 300 includes the following steps.

S310: A UE collects sensing data.

Each sensor configured on the UE may collect sensing data that exists at a specific moment.

S320: The UE determines and displays, according to the collected sensing data and at least one existing behavior recognition model, at least one user behavior corresponding to the collected sensing data.

The UE inputs the sensing data to at least one behavior recognition model in a current behavior recognition model base, to determine a current behavior of a user according to an output result of the at least one behavior recognition model. The UE displays the at least one determined user behavior. If the user approves or tacitly approves the displayed user behavior, a procedure of the method 300 ends; if the user does not approve the displayed user behavior and designates a target user behavior, where the target user behavior is different from the displayed user behavior, the UE executes S330.

S330: The UE determines whether there is a behavior recognition model of a target user behavior indicated by a user instruction.

If the UE has already created the behavior recognition model of the target user behavior, the first UE executes S340; if the UE has not created the behavior recognition model of the target user behavior, the UE executes S350.

S340: The UE updates the behavior recognition model of the target user behavior according to the collected sensing data and the target user behavior indicated by the user instruction.

S350: The UE sends a data download request to a behavior recognition server and the behavior recognition server receives the data download request, where the data download request carries an identifier of the target user behavior.

S360: The behavior recognition server determines a user group of the UE.

If the UE does not belong to any user group in current multiple user groups, the behavior recognition server may execute S370a and S380; if the UE belongs to a user group in current multiple user groups, the behavior recognition server executes S370b and S380.

S370a: The behavior recognition server extracts, from a basic knowledge base, statistical distribution information of a target parameter corresponding to the target user behavior.

The basic knowledge base stores statistical distribution information of a target parameter corresponding to at least one behavior, where the at least one behavior includes the target user behavior.

S370b: The behavior recognition server extracts, from a coordinated knowledge base corresponding to a user group to which the UE belongs, statistical distribution information of a target parameter corresponding to the target user behavior.

S380: The behavior recognition server sends the statistical distribution information of the target parameter to the UE, and the UE receives the statistical distribution information of the target parameter that is sent by the behavior recognition server.

S390: The UE creates the behavior recognition model of the target user behavior according to the statistical distribution information of the target parameter and the collected sensing data.

Therefore, according to the user behavior recognition method in this embodiment of the present disclosure, a user equipment creates a behavior recognition model of a target user behavior according to statistical distribution information of a target parameter corresponding to the target user behavior, where the statistical distribution information of the target parameter is determined according to values of the target parameter that are respectively corresponding to multiple other user equipment. Compared with the prior art in which a behavior recognition module of the target user behavior is created using a large amount of training data, the user behavior recognition method in this embodiment of the present disclosure can improve efficiency and accuracy of creating a behavior recognition model, thereby enhancing user experience.

It should be noted that the example in FIG. 3 is merely intended to help a person skilled in the art better understand embodiments of the present disclosure, instead of limiting a scope of the embodiments of the present disclosure. A person skilled in the art certainly can make various equivalent modifications or changes according to the given example in FIG. 3, and such modifications or changes also fall within the scope of the embodiments of the present disclosure.

It should be understood that sequence numbers of the foregoing processes do not mean execution sequences. The execution sequences of the processes should be determined according to functions and internal logic of the processes, and shall not be construed as any limitation on implementation processes of the embodiments of the present disclosure.

With reference to FIG. 1 to FIG. 3, the foregoing describes in detail the user behavior recognition methods according to the embodiments of the present disclosure. With reference to FIG. 4 to FIG. 8, the following describes in detail a user equipment, a behavior recognition server, and a behavior recognition system according to the embodiments of the present disclosure.

Figure 4:
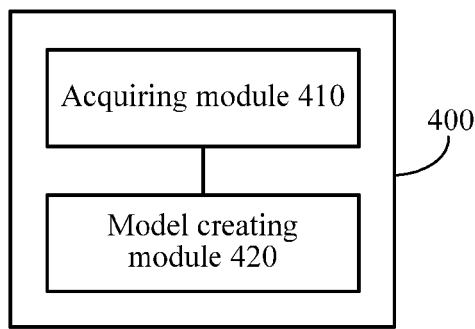
FIG. 4 is a schematic block diagram of a user equipment according to an embodiment of the present disclosure.

FIG. 4 shows a schematic block diagram of a user equipment 400 according to an embodiment of the present disclosure. As shown in FIG. 4, the user equipment 400 includes an acquiring module 410 configured to acquire statistical distribution information of a target parameter corresponding to a target user behavior, where the target parameter includes at least one parameter in a behavior recognition model of the target user behavior, and the statistical distribution information of the target parameter is determined according to values of the target parameter in behavior recognition models of the target user behavior that are respectively corresponding to multiple other user equipment; and a model creating module 420 configured to create and save, according to the statistical distribution information of the target parameter that is acquired by the acquiring module 410, a behavior recognition model of the target user behavior that is corresponding to the user equipment, to recognize the target user behavior.

Therefore, the user equipment in this embodiment of the present disclosure creates a behavior recognition model of a target user behavior according to statistical distribution information of a target parameter corresponding to the target user behavior, where the statistical distribution information of the target parameter is determined according to values of the target parameter that are respectively corresponding to multiple other user equipment. Compared with the prior art in which a behavior recognition module of the target user behavior is created using a large amount of training data, the user equipment in this embodiment of the present disclosure can improve efficiency and accuracy of creating a behavior recognition model, thereby enhancing user experience.

Optionally, the statistical distribution information of the target parameter includes at least one piece of the following information: a probability distribution curve of the target parameter, an expected value of the target parameter, and a value of the target parameter that has a largest occurrence probability.

Optionally, as another embodiment, if the behavior recognition model is a naive Bayes classifier, a first feature with continuous feature values in the naive Bayes classifier is a first target parameter, a second feature with discrete feature values in the naive Bayes classifier is a second target parameter, and the statistical distribution information of the target parameter includes at least one piece of the following information: an expected value of a normal distribution parameter that the first feature has in each category of the target user behavior, and a statistical distribution curve of the second feature for each category of the target user behavior.

Optionally, as another embodiment, the acquiring module 410 includes a first sending unit configured to send a data download request to a behavior recognition server, where the data download request includes an identifier of the target user behavior; and a first receiving unit configured to receive the statistical distribution information of the target parameter that is determined by the behavior recognition server according to the identifier of the target user behavior that is sent by the first sending unit, where the statistical distribution information of the target parameter is determined by the behavior recognition server according to the values of the target parameter in the multiple behavior recognition models of the target user behavior that are sent by the multiple other user equipment to the behavior recognition server.

Optionally, as another embodiment, the acquiring module 410 includes a second receiving unit configured to receive the behavior recognition models of the target user behavior that are respectively sent by the multiple other user equipment; and a determining unit configured to determine the statistical distribution information of the target parameter according to the values of the target parameter in the multiple behavior recognition models of the target user behavior that are received by the second receiving unit.

Optionally, as another embodiment, the user equipment 400 further includes a sending module configured to send the behavior recognition model of the target user behavior that is created by the model creating module 420 to the behavior recognition server, so that the behavior recognition server updates the statistical distribution information of the target parameter according to the behavior recognition model; or the sending module is configured to send the behavior recognition model of the target user behavior that is created by the model creating module 420 to another user equipment, so that the another UE updates the statistical distribution information of the target parameter according to the behavior recognition model.

The user equipment 400 according to this embodiment of the present disclosure may be corresponding to the first user equipment in the user behavior recognition methods according to the embodiments of the present disclosure, and the foregoing and other operations and/or functions of modules in the user equipment 400 are used to implement corresponding procedures of the methods in FIG. 1 to FIG. 3. For brevity, details are not described herein again.

Therefore, the user equipment for user behavior recognition in this embodiment of the present disclosure creates a behavior recognition model of a target user behavior according to statistical distribution information of a target parameter corresponding to the target user behavior, where the statistical distribution information of the target parameter is determined according to values of the target parameter that are respectively corresponding to multiple other user equipment. Compared with the prior art in which a behavior recognition module of the target user behavior is created using a large amount of training data, the user equipment in this embodiment of the present disclosure can improve efficiency and accuracy of creating a behavior recognition model, thereby enhancing user experience.

Figure 5:
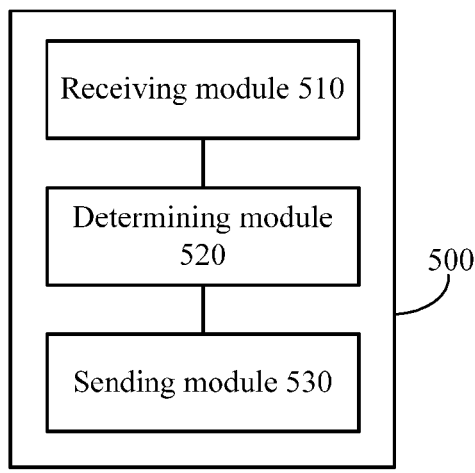
FIG. 5 is a schematic block diagram of a behavior recognition server according to an embodiment of the present disclosure.

FIG. 5 shows a schematic block diagram of a behavior recognition server 500 according to an embodiment of the present disclosure. As shown in FIG. 5, the behavior recognition server 500 includes a receiving module 510 configured to receive a data download request sent by a first user equipment, where the data download request includes an identifier of a target user behavior; a determining module 520 configured to determine, according to the identifier of the target user behavior that is received by the receiving module 510, statistical distribution information of a target parameter corresponding to the target user behavior, where the target parameter includes at least one parameter in a behavior recognition model of the target user behavior, and the statistical distribution information of the target parameter is determined according to values of the target parameter in behavior recognition models of the target user behavior that are respectively corresponding to multiple other user equipment; and a sending module 530 configured to send, to the first user equipment, the statistical distribution information of the target parameter that is determined by the determining module 520, so that the first user equipment creates the behavior recognition model of the target user behavior according to the statistical distribution information of the target parameter.

Therefore, the behavior recognition server according to this embodiment of the present disclosure determines, according to values of a target parameter that are respectively corresponding to multiple user equipment, statistical distribution information of the target parameter corresponding to a target user behavior, and sends the statistical distribution information of the target parameter corresponding to the target user behavior to a user equipment according to a request of the user equipment, which can improve efficiency and accuracy of creating a behavior recognition model, thereby enhancing user experience.

Optionally, the statistical distribution information of the target parameter includes at least one piece of the following information: a probability distribution curve of the target parameter, an expected value of the target parameter, and a value of the target parameter that has a largest occurrence probability.

Optionally, as another embodiment, if the behavior recognition model of the target user behavior is a naive Bayes classifier, a first feature with continuous feature values in the naive Bayes classifier is a first target parameter, a second feature with discrete feature values in the naive Bayes classifier is a second target parameter, and the statistical distribution information of the target parameter includes at least one piece of the following information: an expected value of a normal distribution parameter that the first feature has in each category of the target user behavior, and a statistical distribution curve of the second feature for each category of the target user behavior.

Optionally, as another embodiment, the behavior recognition server has a basic knowledge base and multiple coordinated knowledge bases, where the basic knowledge base is used to store statistical distribution information of a target parameter corresponding to at least one user behavior, where the statistical distribution information is commonly used by multiple user groups, and each coordinated knowledge base in the multiple coordinated knowledge bases is used to store statistical distribution information of a target parameter corresponding to at least one user behavior, where the statistical distribution information is exclusively used by one user group in the multiple user groups.

Accordingly, the determining module 520 includes a first determining unit configured to determine a user group of the first user equipment; and a second determining unit configured to, if the first determining unit determines that the first user equipment does not belong to any user group in the multiple user groups, determine, by the behavior recognition server from the basic knowledge base, the statistical distribution information of the target parameter corresponding to the target user behavior; or a third determining unit configured to, if the first determining unit determines that the first user equipment belongs to a first user group in the multiple user groups, determine, by the behavior recognition server from a coordinated knowledge base corresponding to the first user group, the statistical distribution information of the target parameter corresponding to the target user behavior.

Optionally, as another embodiment, the receiving module 510 is further configured to receive the behavior recognition model of the target user behavior that is sent by the first user equipment and created by the first user equipment according to the statistical distribution information of the target parameter that is sent by the sending module 530.

Accordingly, the behavior recognition server 500 further includes an updating module configured to update the statistical distribution information of the target parameter according to the behavior recognition model that is sent by the first user equipment and received by the receiving module 510.

Optionally, as another embodiment, the updating module includes a fourth determining unit configured to determine, according to the behavior recognition model that is sent by the first user equipment and received by the receiving module 510, a value of the target parameter that is corresponding to the first user equipment; and a statistics collecting unit configured to collect mathematical statistics on a value of the target parameter according to the values of the target parameter that are respectively corresponding to the multiple other user equipment, and the value of the target parameter that is corresponding to the first user equipment and determined by the fourth determining unit, and determine that a statistical result is updated statistical distribution information of the target parameter.

Optionally, as another embodiment, the receiving module 510 is further configured to receive, before receiving the data download request sent by the first user equipment, the behavior recognition models of the target user behavior that are respectively sent by the multiple other user equipment; and the determining module 520 is further configured to determine, according to the behavior recognition models of the target user behavior that are respectively sent by the multiple other user equipment and received by the receiving module 510, the values of the target parameter that are respectively corresponding to the multiple other user equipment, and determine the statistical distribution information of the target parameter according to the values of the target parameter that are respectively corresponding to the multiple other user equipment.

The behavior recognition server 500 according to this embodiment of the present disclosure may be corresponding to the behavior recognition server in the user behavior recognition methods according to the embodiments of the present disclosure, and the foregoing and other operations and/or functions of modules in the behavior recognition server 500 are used to implement corresponding procedures of the methods in FIG. 1 to FIG. 3. For brevity, details are not described herein again.

Therefore, the behavior recognition server according to this embodiment of the present disclosure determines, according to values of a target parameter that are respectively corresponding to multiple user equipment, statistical distribution information of the target parameter corresponding to a target user behavior, and sends the statistical distribution information of the target parameter corresponding to the target user behavior to a user equipment according to a request of the user equipment, which can improve efficiency and accuracy of creating a behavior recognition model, thereby enhancing user experience.

Figure 6:
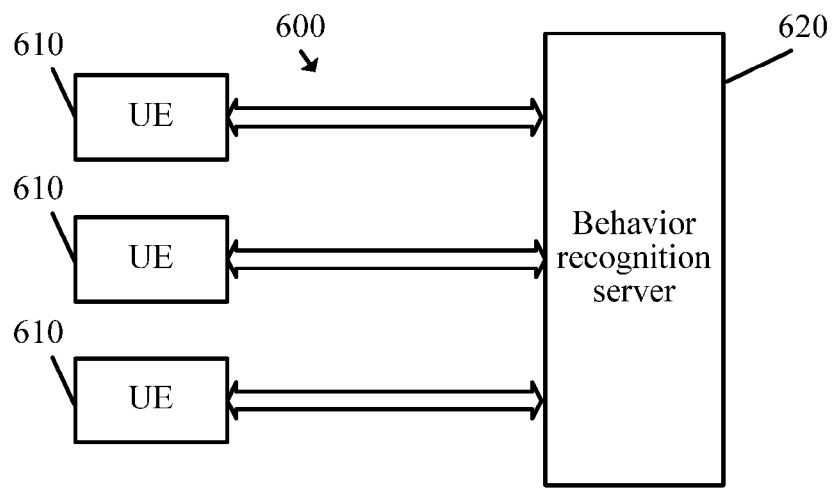
FIG. 6 is a schematic diagram of a network architecture of a behavior recognition system according to an embodiment of the present disclosure.

FIG. 6 is a schematic diagram of a network architecture of a behavior recognition system 600 according to an embodiment of the present disclosure. The behavior recognition system 600 includes multiple user equipment 610 and a behavior recognition server 620, where a first user equipment 610 in the multiple user equipment 610 is configured to send a data download request to the behavior recognition server 620, where the data download request includes an identifier of a target user behavior; the behavior recognition server 620 is configured to determine, according to the identifier of the target user behavior, statistical distribution information of a target parameter corresponding to the target user behavior, and send the statistical distribution information of the target parameter to the first user equipment, where the target parameter includes at least one parameter in a behavior recognition model of the target user behavior, and the statistical distribution information of the target parameter is determined according to values of the target parameter in behavior recognition models of the target user behavior that are respectively corresponding to multiple other user equipment; and the first user equipment 610 is further configured to receive the statistical distribution information of the target parameter that is sent by the behavior recognition server 620, and create and save, according to the statistical distribution information of the target parameter, a behavior recognition model of the target user behavior that is corresponding to the first user equipment, to recognize the target user behavior.

After creating or updating a behavior recognition model of one user behavior, some or all user equipment in the multiple user equipment 610 sends the created or updated behavior recognition model to the behavior recognition server 620, and the behavior recognition server 620 may determine the statistical distribution information of the target parameter according to received multiple behavior recognition models of one user behavior, and save the statistical distribution information of the target parameter in an empirical knowledge base. When a UE in the multiple user equipment 610 needs to newly create a behavior recognition model of this user behavior, the UE may request statistical distribution information of a target parameter corresponding to this user behavior from the behavior recognition server 620, and creates the behavior recognition model of this user behavior according to the statistical distribution information of the target parameter.

Optionally, the behavior recognition server 620 may further divide the multiple user equipment 610 into multiple user groups, and store statistical distribution information of a target parameter corresponding to at least one user behavior for each user group in the multiple user groups. In this way, the behavior recognition server 620 may include one basic knowledge base and multiple coordinated knowledge bases, where the basic knowledge base is used to store statistical distribution information of the target parameter corresponding to the target user behavior, where the statistical distribution information is commonly used by the multiple user groups, and each coordinated knowledge base in the multiple coordinated knowledge bases is used to store statistical distribution information of the target parameter corresponding to the target user behavior, where the statistical distribution information is exclusively used by one user group. However, this embodiment of the present disclosure is not limited thereto.

Optionally, as another embodiment, the statistical distribution information of the target parameter includes at least one piece of the following information: a probability distribution curve of the target parameter, an expected value of the target parameter, and a value of the target parameter that has a largest occurrence probability.

Optionally, as another embodiment, the behavior recognition server 620 may further update, periodically or in a triggered manner, statistical distribution information of a target parameter corresponding to one user behavior. For example, the behavior recognition server 620 may update the statistical distribution information of the target parameter corresponding to this user behavior at an internal of dozens of days, or may update the statistical distribution information of the target parameter corresponding to this user behavior each time when receiving a behavior recognition model sent by a UE in the multiple user equipment 610, or update the statistical distribution information of the target parameter corresponding to this user behavior when a quantity of received behavior recognition models of this user behavior exceeds a threshold. This embodiment of the present disclosure is not limited thereto.

Therefore, according to the behavior recognition system in this embodiment of the present disclosure, a behavior recognition server determines, according to values of a target parameter that are respectively corresponding to multiple user equipment, statistical distribution information of the target parameter corresponding to a target user behavior, and sends the statistical distribution information of the target parameter corresponding to the target user behavior to a user equipment according to a request of the user equipment. The user equipment creates a behavior recognition model of the target user behavior according to the statistical distribution information of the target parameter that is sent by the behavior recognition server. Compared with the prior art in which a behavior recognition module of the target user behavior is created using a large amount of training data, the behavior recognition system in this embodiment of the present disclosure can improve efficiency and accuracy of creating a behavior recognition model, thereby enhancing user experience.

Figure 7:
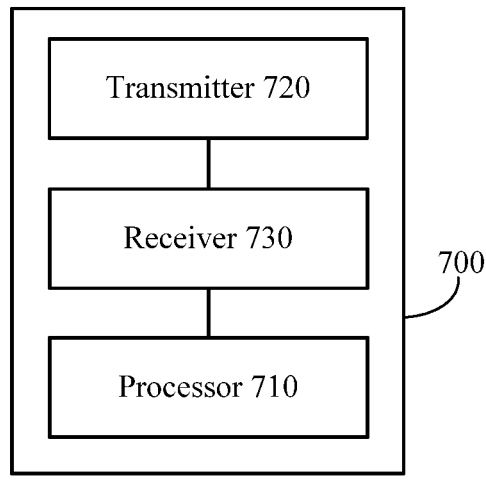
FIG. 7 is a schematic block diagram of a user equipment according to another embodiment of the present disclosure.

FIG. 7 shows a schematic block diagram of a user equipment 700 according to another embodiment of the present disclosure. As shown in FIG. 7, the user equipment 700 includes a processor 710 configured to acquire statistical distribution information of a target parameter corresponding to a target user behavior, where the target parameter includes at least one parameter in a behavior recognition model of the target user behavior, and the statistical distribution information of the target parameter is determined according to values of the target parameter in behavior recognition models of the target user behavior that are respectively corresponding to multiple other user equipment; and create and save, according to the statistical distribution information of the target parameter, a behavior recognition model of the target user behavior that is corresponding to the user equipment, to recognize the target user behavior.

Therefore, the user equipment in this embodiment of the present disclosure creates a behavior recognition model of a target user behavior according to statistical distribution information of a target parameter corresponding to the target user behavior, where the statistical distribution information of the target parameter is determined according to values of the target parameter that are respectively corresponding to multiple other user equipment. Compared with the prior art in which a behavior recognition module of the target user behavior is created using a large amount of training data, the user equipment in this embodiment of the present disclosure can improve efficiency and accuracy of creating a behavior recognition model, thereby enhancing user experience.

It should be understood that in this embodiment of the present disclosure, the processor 710 may be a central processing unit (CPU), or the processor 710 may be another general-purpose processor, a digital signal processor (DSP), an application-specific integrated circuit (ASIC), a field-programmable gate array (FPGA), another programmable logic device, a discrete gate or transistor logic device, a discrete hardware component, or the like. The general-purpose processor may be a microprocessor, or the processor may be any conventional processor or the like.

Optionally, the apparatus 700 may further include a memory, and the memory may include a read-only memory and a random access memory, and provide data and an instruction for the processor 710. A part of the memory may further include a non-volatile random access memory. For example, the memory may further store information about a device type.

During an implementation process, the steps in the foregoing methods may be completed by means of an integrated logic circuit of hardware in the processor 710 or an instruction in a form of software. Steps of the methods disclosed with reference to the embodiments of the present disclosure may be directly executed and completed by means of a hardware processor, or may be executed and completed using a combination of hardware and software modules in the processor. The software module may be located in a mature storage medium in the field, such as a random access memory, a flash memory, a read-only memory, a programmable read-only memory, an electrically-erasable programmable memory, or a register. The storage medium is located in the memory, and the processor 710 reads information in the memory and completes the steps in the foregoing methods in combination with hardware of the processor 710. To avoid repetition, details are not described herein.

Optionally, the statistical distribution information of the target parameter includes at least one piece of the following information: a probability distribution curve of the target parameter, an expected value of the target parameter, and a value of the target parameter that has a largest occurrence probability.

Optionally, as another embodiment, if the behavior recognition model is a naive Bayes classifier, a first feature with continuous feature values in the naive Bayes classifier is a first target parameter, a second feature with discrete feature values in the naive Bayes classifier is a second target parameter, and the statistical distribution information of the target parameter includes at least one piece of the following information: an expected value of a normal distribution parameter that the first feature has in each category of the target user behavior, and a statistical distribution curve of the second feature for each category of the target user behavior.

Optionally, as another embodiment, as shown in FIG. 7, the user equipment 700 includes a transmitter 720 configured to send a data download request to a behavior recognition server, where the data download request includes an identifier of the target user behavior; and a receiver 730 configured to receive the statistical distribution information of the target parameter that is determined by the behavior recognition server according to the identifier of the target user behavior that is sent by the transmitter 720, where the statistical distribution information of the target parameter is determined by the behavior recognition server according to the values of the target parameter in the multiple behavior recognition models of the target user behavior that are sent by the multiple other user equipment to the behavior recognition server.

Accordingly, the processor 710 is configured to acquire, using the receiver 730, the statistical distribution information of the target parameter corresponding to the target user behavior.

Optionally, as another embodiment, the user equipment 700 further includes a receiver 730 configured to receive the behavior recognition models of the target user behavior that are respectively sent by the multiple other user equipment.

Accordingly, the processor 710 is configured to determine the statistical distribution information of the target parameter according to the values of the target parameter in the multiple behavior recognition models of the target user behavior that are received by the receiver 730.

Optionally, as another embodiment, the user equipment 700 further includes a transmitter 720 configured to send the behavior recognition model of the target user behavior that is created by the model creating module to the behavior recognition server, so that the behavior recognition server updates the statistical distribution information of the target parameter according to the behavior recognition model; or the transmitter 720 is configured to send the behavior recognition model of the target user behavior that is created by the processor 710 to another user equipment, so that the another user equipment updates the statistical distribution information of the target parameter according to the behavior recognition model.

The user equipment 700 according to this embodiment of the present disclosure may be corresponding to the first user equipment in the user behavior recognition methods according to the embodiments of the present disclosure, and the foregoing and other operations and/or functions of modules in the user equipment 700 are used to implement corresponding procedures of the methods in FIG. 1 to FIG. 3. For brevity, details are not described herein again.

Therefore, the user equipment for user behavior recognition in this embodiment of the present disclosure creates a behavior recognition model of a target user behavior according to statistical distribution information of a target parameter corresponding to the target user behavior, where the statistical distribution information of the target parameter is determined according to values of the target parameter that are respectively corresponding to multiple other user equipment. Compared with the prior art in which a behavior recognition module of the target user behavior is created using a large amount of training data, the user equipment in this embodiment of the present disclosure can improve efficiency and accuracy of creating a behavior recognition model, thereby enhancing user experience.

Figure 8:
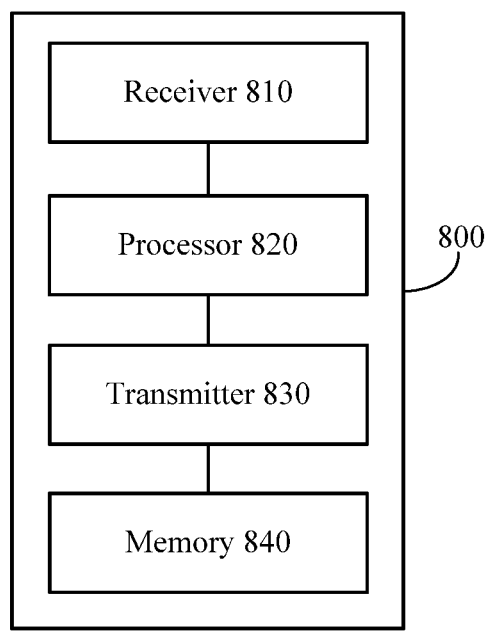
FIG. 8 is a schematic block diagram of a behavior recognition server according to another embodiment of the present disclosure.

FIG. 8 shows a schematic block diagram of a behavior recognition server 800 according to an embodiment of the present disclosure. As shown in FIG. 8, the behavior recognition server 800 includes a receiver 810 configured to receive a data download request sent by a first user equipment, where the data download request includes an identifier of a target user behavior; a processor 820 configured to determine, according to the identifier of the target user behavior that is received by the processor 810, statistical distribution information of a target parameter corresponding to the target user behavior, where the target parameter includes at least one parameter in a behavior recognition model of the target user behavior, and the statistical distribution information of the target parameter is determined according to values of the target parameter in behavior recognition models of the target user behavior that are respectively corresponding to multiple other user equipment; and a transmitter 830 configured to send, to the first user equipment, the statistical distribution information of the target parameter that is determined by the processor 820, so that the first user equipment creates the behavior recognition model of the target user behavior according to the statistical distribution information of the target parameter.

Therefore, the behavior recognition server according to this embodiment of the present disclosure determines, according to values of a target parameter that are respectively corresponding to multiple user equipment, statistical distribution information of the target parameter corresponding to a target user behavior, and sends the statistical distribution information of the target parameter corresponding to the target user behavior to a user equipment according to a request of the user equipment, which can improve efficiency and accuracy of creating a behavior recognition model, thereby enhancing user experience.

As shown in FIG. 8, the behavior recognition server 800 may further include a memory 840, where the memory 840 includes an empirical knowledge base, which is used to store statistical distribution information of a target parameter corresponding to at least one user behavior including the target user behavior.

It should be understood that in this embodiment of the present disclosure, the processor 820 may be a CPU, or the processor 820 may be another general-purpose processor, a DSP, an ASIC, a FPGA, another programmable logic device, a discrete gate or transistor logic device, a discrete hardware component, or the like. The general-purpose processor may be a microprocessor, or the processor may be any conventional processor or the like.

Optionally, the memory 840 may include a read-only memory and a random access memory, and provide data and an instruction for the processor 820. A part of the memory may further include a non-volatile random access memory. For example, the memory 840 may further store information about a device type.

During an implementation process, the steps in the foregoing methods may be completed by means of an integrated logic circuit of hardware in the processor 820 or an instruction in a form of software. Steps of the methods disclosed with reference to the embodiments of the present disclosure may be directly executed and completed by means of a hardware processor, or may be executed and completed using a combination of hardware and software modules in the processor. The software module may be located in a mature storage medium in the field, such as a random access memory, a flash memory, a read-only memory, a programmable read-only memory, an electrically-erasable programmable memory, or a register. The storage medium is located in the memory, and the processor 820 reads information in the memory 840 and completes the steps in the foregoing methods in combination with hardware of the processor 840. To avoid repetition, details are not described herein.

Optionally, the statistical distribution information of the target parameter includes at least one piece of the following information: a probability distribution curve of the target parameter, an expected value of the target parameter, and a value of the target parameter that has a largest occurrence probability.

Optionally, as another embodiment, if the behavior recognition model of the target user behavior is a naive Bayes classifier, a first feature with continuous feature values in the naive Bayes classifier is a first target parameter, a second feature with discrete feature values in the naive Bayes classifier is a second target parameter, and the statistical distribution information of the target parameter includes at least one piece of the following information: an expected value of a normal distribution parameter that the first feature has in each category of the target user behavior, and a statistical distribution curve of the second feature for each category of the target user behavior.

Optionally, as another embodiment, the memory 840 includes a basic knowledge base and multiple coordinated knowledge bases, where the basic knowledge base is used to store statistical distribution information of a target parameter corresponding to at least one user behavior, where the statistical distribution information is commonly used by multiple user groups, and each coordinated knowledge base in the multiple coordinated knowledge bases is used to store statistical distribution information of a target parameter corresponding to at least one user behavior, where the statistical distribution information is exclusively used by one user group in the multiple user groups.

Accordingly, the processor 820 is configured to determine a user group of the first user equipment; and if the first user equipment does not belong to any user group in the multiple user groups, determine, by the behavior recognition server from the basic knowledge base, the statistical distribution information of the target parameter corresponding to the target user behavior; or if the first user equipment belongs to a first user group in the multiple user groups, determine, by the behavior recognition server from a coordinated knowledge base corresponding to the first user group, the statistical distribution information of the target parameter corresponding to the target user behavior.

Optionally, as another embodiment, the receiver 810 is further configured to receive the behavior recognition model of the target user behavior that is sent by the first user equipment and created by the first user equipment according to the statistical distribution information of the target parameter that is sent by the transmitter 830.

Accordingly, the processor 820 is further configured to update the statistical distribution information of the target parameter according to the behavior recognition model that is sent by the first user equipment and received by the receiver 810.

Optionally, as another embodiment, the processor 820 is configured to determine, according to the behavior recognition model sent by the first user equipment, a value of the target parameter that is corresponding to the first user equipment, collect mathematical statistics on a value of the target parameter according to the values of the target parameter that are respectively corresponding to the multiple other user equipment, and the value of the target parameter that is corresponding to the first user equipment, and determine that a statistical result is updated statistical distribution information of the target parameter.

Optionally, as another embodiment, the receiver 810 is further configured to receive, before receiving the data download request sent by the first user equipment, the behavior recognition models of the target user behavior that are respectively sent by the multiple other user equipment.

Accordingly, the processor 820 is further configured to determine, according to the behavior recognition models of the target user behavior that are respectively sent by the multiple other user equipment and received by the receiver 810, the values of the target parameter that are respectively corresponding to the multiple other user equipment, and determine the statistical distribution information of the target parameter according to the values of the target parameter that are respectively corresponding to the multiple other user equipment.

The behavior recognition server 800 according to this embodiment of the present disclosure may be corresponding to the behavior recognition server in the user behavior recognition methods according to the embodiments of the present disclosure, and the foregoing and other operations and/or functions of modules in the behavior recognition server 800 are used to implement corresponding procedures of the methods in FIG. 1 to FIG. 3. For brevity, details are not described herein again.

Therefore, the behavior recognition server according to this embodiment of the present disclosure determines, according to values of a target parameter that are respectively corresponding to multiple user equipment, statistical distribution information of the target parameter corresponding to a target user behavior, and sends the statistical distribution information of the target parameter corresponding to the target user behavior to a user equipment according to a request of the user equipment, which can improve efficiency and accuracy of creating a behavior recognition model, thereby enhancing user experience.

It should be understood that, the term "and/or" in the embodiments of the present disclosure describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

A person of ordinary skill in the art may be aware that, in combination with the examples described in the embodiments disclosed in this specification, method steps and units may be implemented by electronic hardware, computer software, or a combination thereof. To clearly describe the interchangeability between the hardware and the software, the foregoing has generally described steps and compositions of each embodiment according to functions. Whether the functions are performed by hardware or software depends on particular applications and design constraint conditions of the technical solutions. A person of ordinary skill in the art may use different methods to implement the described functions for each particular application, but it shall not be considered that the implementation goes beyond the scope of the present disclosure.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments of the present disclosure.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the prior art, or all or some of the technical solutions may be implemented in the form of a software product. The software product is stored in a storage medium and includes several instructions for instructing a computer apparatus (which may be a personal computer, a server, or a network apparatus) to perform all or some of the steps of the methods described in the embodiments of the present disclosure. The foregoing storage medium includes any medium that can store program code, such as a universal serial bus (USB) flash drive, a removable hard disk, a read-only memory (ROM), a random access memory (RAM), a magnetic disk, or an optical disc.

The foregoing descriptions are merely specific implementation manners of the present disclosure, but are not intended to limit the protection scope of the present disclosure.

What is claimed is:

1. A user behavior recognition method, comprising:
sending, by a first user equipment, a data download request to a behavior recognition server, wherein the data download request comprises an identifier of a target user behavior; and
receiving, by the first user equipment, the statistical distribution information of a target parameter according to the identifier of the target user behavior from the behavior recognition server, wherein the target parameter comprises at least one parameter in a behavior recognition model of the target user behavior, wherein the statistical distribution information of the target parameter is determined according to values of the target parameter in a plurality of behavior recognition models of the target user behavior that respectively correspond to a plurality of other user equipment; and
creating and saving, by the first user equipment according to the statistical distribution information of the target parameter, a behavior recognition model of the target user behavior that corresponds to the first user equipment to recognize the target user behavior.

2. The method according to claim 1, wherein the statistical distribution information of the target parameter comprises at least one a probability distribution curve of the target parameter, an expected value of the target parameter, or a value of the target parameter that has a largest occurrence probability.

3. The method according to claim 1, wherein the behavior recognition model is a naive Bayes classifier, wherein a first feature with continuous feature values in the naive Bayes classifier is a first target parameter, wherein a second feature with discrete feature values in the naive Bayes classifier is a second target parameter, and wherein the statistical distribution information of the target parameter comprises at least one of an expected value of a normal distribution parameter that the first feature has in each category of the target user behavior, or a statistical distribution curve of the second feature for each category of the target user behavior.

4. The method according to claim 1, further comprising sending, by the first user equipment, the behavior recognition model of the target user behavior to a behavior recognition server, such that the behavior recognition server updates the statistical distribution information of the target parameter according to a value of the target parameter in the behavior recognition model.

5. A user behavior recognition method, comprising:
receiving, by a behavior recognition server, a plurality of behavior recognition models of a target user behavior from a plurality of other user equipment;
determining, by the behavior recognition server according to the behavior recognition models of the target user behavior, a plurality of values of a target parameter that respectively correspond to the other user equipment, wherein the target parameter comprises at least one parameter in a behavior recognition model of the target user behavior;
determining, by the behavior recognition server, statistical distribution information of the target parameter according to the values of the target parameter in the behavior recognition models that respectively correspond to the other user equipment;
receiving, by the behavior recognition server, a data download request from a first user equipment, wherein the data download request comprises an identifier of the target user behavior;

determining, by the behavior recognition server, the statistical distribution information of the target parameter corresponding to the target user behavior according to the identifier of the target user behavior; and sending, by the behavior recognition server, the statistical distribution information of the target parameter to the first user equipment to create the behavior recognition model of the target user behavior according to the statistical distribution information of the target parameter.

6. The method according to claim 5, wherein the statistical distribution information of the target parameter comprises at least one of a probability distribution curve of the target parameter, an expected value of the target parameter, or a value of the target parameter that has a largest occurrence probability.

7. The method according to claim 5, wherein the behavior recognition model of the target user behavior is a naive Bayes classifier, wherein a first feature with continuous feature values in the naive Bayes classifier is a first target parameter, wherein a second feature with discrete feature values in the naive Bayes classifier is a second target parameter, and wherein the statistical distribution information of the target parameter comprises at least one of an expected value of a normal distribution parameter that the first feature has in each category of the target user behavior, or a statistical distribution curve of the second feature for each category of the target user behavior.

8. The method according to claim 5, wherein the behavior recognition server has a basic knowledge base and a plurality of coordinated knowledge bases, wherein the basic knowledge base is used to store statistical distribution information of a target parameter corresponding to at least one user behavior, wherein the statistical distribution information is commonly used by a plurality of user groups, and wherein each coordinated knowledge base in the coordinated knowledge bases is used to store statistical distribution information of the target parameter corresponding to the at least one user behavior, wherein the statistical distribution information is exclusively used by one user group in the user groups, wherein the at least one user behavior comprises the target user behavior, and wherein determining, by the behavior recognition server according to the identifier of the target user behavior, the statistical distribution information of the target parameter corresponding to the target user behavior comprises:

determining, by the behavior recognition server, a user group of the first user equipment;

determining, by the behavior recognition server from the basic knowledge base, the statistical distribution information of the target parameter corresponding to the target user behavior in response to the first user equipment not belonging to any user group in the multiple user groups; and determining, by the behavior recognition server from a coordinated knowledge base corresponding to a first user group, the statistical distribution information of the target parameter corresponding to the target user behavior in response to the first user equipment belonging to the first user group.

9. The method according to claim 5, further comprising:
receiving, by the behavior recognition server, the behavior recognition model of the target user behavior according to the statistical distribution information of the target parameter from the first user equipment; and updating, by the behavior recognition server, the statistical distribution information of the target parameter according to the behavior recognition model.

10. The method according to claim 9, wherein updating the statistical distribution information of the target parameter according to the behavior recognition model comprises:

determining, by the behavior recognition server according to the behavior recognition model received from the first user equipment, a value of the target parameter that corresponds to the first user equipment;

collecting, by the behavior recognition server, mathematical statistics on the value of the target parameters corresponding to the first user equipment according to the values of the target parameter that respectively correspond to the other user equipment; and determining that a statistical result is updated statistical distribution information of the target parameter.

11. A user equipment, comprising:
a memory configured to store program instructions;
a processor coupled to the memory and configured to execute the program instructions, which cause the processor to be configured to:

send a data download request to a behavior recognition server, wherein the data download request comprises an identifier of a target user behavior; and receive the statistical distribution information of a target parameter according to the identifier of the target user behavior from the behavior recognition server, wherein the target parameter comprises at least one parameter in a behavior recognition model of the target user behavior, wherein the statistical distribution information of the target parameter is determined according to values of the target parameter in a plurality of behavior recognition models of the target user behavior that respectively correspond to a plurality of other user equipment; and creating and saving, according to the statistical distribution information of the target parameter, a behavior recognition model of the target user behavior that corresponds to the user equipment to recognize the target user behavior.

12. A behavior recognition server, comprising:
a memory configured to store program instructions;
a processor coupled to the memory and configured to execute the program instructions, which cause the processor to be configured to:

receive a plurality of behavior recognition models of a target user behavior from a plurality of other user equipment;

determine, according to the behavior recognition models of the target user behavior, a plurality of values of a target parameter the respectively correspond to the other user equipment, wherein the target parameter comprises at least one parameter in a behavior recognition model of the target user behavior;

determine statistical distribution information of the target parameter according to the values of the target parameter in the behavior recognition models that respectively correspond to the other user equipment;

receive a data download request from a first user equipment, wherein the data download request comprises an identifier of the target user behavior;

determine the statistical distribution information of the target parameter corresponding to the target user behavior according to the identifier of the target user behavior; and send the statistical distribution information of the target parameter to the first user equipment to create the behavior recognition model of the target user behavior according to the statistical distribution information of the target parameter.

13. The behavior recognition server according to claim 12, wherein the instructions, when executed, further cause the processor to be configured to:
receive the behavior recognition model of the target user behavior according to the statistical distribution information of the target parameter; and
update the statistical distribution information of the target parameter according to the behavior recognition model.

14. The behavior recognition server according to claim 13, wherein the instructions, when executed, further cause the processor to be configured to:
determine, according to the behavior recognition model received from the first user equipment, a value of the target parameter that corresponds to the first user equipment;
collect mathematical statistics on the value of the target parameter corresponding to the first user equipment according to the values of the target parameter that respectively correspond to the other user equipment; and
determine that a statistical result is updated statistical distribution information of the target parameter.

* * * * *

UNITED STATES PATENT AND TRADEMARK OFFICE
CERTIFICATE OF CORRECTION

PATENT NO.         : 10,409,841 B2
APPLICATION NO.    : 15/358410
DATED              : September 10, 2019
INVENTOR(S)        : Qiang Yang, Ke Deng and Wing Ki Leung It is certified that error appears in the above-identified patent and that said Letters Patent is hereby corrected as shown below:

In the Claims

Claim 10, Column 36, Line 12: "parameters" should read "parameter"

Claim 12, Column 36, Line 53: "the respectively correspond" should read "that respectively correspond"

Signed and Sealed this
Twenty-ninth Day of October, 2019

Andrei Iancu
*Director of the United States Patent and Trademark Office*